(12) United States Patent
Abe et al.

(10) Patent No.: US 8,619,374 B2
(45) Date of Patent: Dec. 31, 2013

(54) LENS CONTROL APPARATUS AND INTERCHANGEABLE LENS INCLUDING LENS CONTROL APPARATUS

(75) Inventors: Takashi Abe, Ehime (JP); Hiroyuki Kawahara, Osaka (JP)

(73) Assignee: Panasonic Corporation, Osaka (JP)

( * ) Notice: Subject to any disclaimer, the term of this patent is extended or adjusted under 35 U.S.C. 154(b) by 22 days.

(21) Appl. No.: 13/540,680

(22) Filed: Jul. 3, 2012

(65) Prior Publication Data

US 2013/0010373 A1 Jan. 10, 2013

(30) Foreign Application Priority Data

Jul. 5, 2011 (JP) ................................. 2011-148911

(51) Int. Cl.
*G02B 15/14* (2006.01)
(52) U.S. Cl.
USPC ............................ 359/698; 359/697; 359/694
(58) Field of Classification Search
USPC .................................. 359/694–701, 811–830
See application file for complete search history.

(56) References Cited

U.S. PATENT DOCUMENTS

| 7,697,218 B2* | 4/2010 | Ishikawa et al. ............... 359/697 |
| 8,462,445 B2* | 6/2013 | Maniwa et al. ............... 359/696 |
| 2006/0209192 A1 | 9/2006 | Shinohara et al. |
| 2007/0201141 A1 | 8/2007 | Kato et al. |

FOREIGN PATENT DOCUMENTS

| JP | 2-266312 | 10/1990 |
| JP | 2006-259344 | 9/2006 |
| JP | 2007-225963 | 9/2007 |
| JP | 2007-292978 | 11/2007 |
| JP | 2010-256739 | 11/2010 |

* cited by examiner

*Primary Examiner* — Mohammed Hasan
(74) *Attorney, Agent, or Firm* — Panasonic Patent Center

(57) ABSTRACT

A lens control apparatus, and an interchangeable lens including the lens control apparatus, are provided which can obtain, in zoom tracking operation, excellent optical images at subject distances in a wider range. A lens control apparatus controls drive of an optical system including a first and a second focus lens for adjusting a focus state and a zoom lens for adjusting an angle of view. The lens control apparatus includes: a first driver that drives the first focus lens; a second driver that drives the second focus lens; a controller that controls the first and second drivers; and a storage unit that stores first and second tracking data, the first and second tracking data each being information that associates a position of the first and second focus lenses respectively with a position of the zoom lens for focusing on a subject.

12 Claims, 15 Drawing Sheets

LENS CONTROL APPARATUS AND INTERCHANGEABLE LENS INCLUDING LENS CONTROL APPARATUS

BACKGROUND

1. Technical Field

The present disclosure relates to a lens control apparatus that controls a plurality of lenses, and an interchangeable lens including such a lens control apparatus.

2. Related Art

An imaging apparatus having a focus lens and a zoom lens is well-known wherein, when the zoom magnification is changed in a focus state, zoom tracking is operated so that the focus state can be maintained.

For example, JP 02-266312 A discloses a zoom lens system in which, when the zoom magnification is changed in a focus state, in order to maintain the focus state, a focus lens or correction lens is driven according to a tracking curve.

In zoom tracking operation by a single focus lens or a single correction lens like the conventional case, maintenance of a focus state upon a change in zoom magnification is possible, but there is a problem that optical images with excellent optical properties (peripheral resolution, aberration, etc.) are not always obtained depending on the subject distance. For example, when close-in shooting is performed, excellent optical properties cannot be obtained.

In the present disclosure, a lens control apparatus is provided that can obtain, in zoom tracking operation, excellent optical images at subject distances in a wider range. An interchangeable lens including such lens control apparatus is also provided.

SUMMARY

In one aspect, a lens control apparatus is provided that controls drive of an optical system including a first and a second focus lens; and a zoom lens. The lens control apparatus includes: a first driver that drives the first focus lens; a second driver that drives the second focus lens; a controller that controls the first and second drivers; and a storage unit that stores first tracking data and second tracking data, the first tracking data being information that associates a position of the first focus lens with a position of the zoom lens, and the second tracking data being information that associates a position of the second focus lens with the position of the zoom lens. When the controller drives the first and second focus lenses, the controller: determines a first target position, the first target position being a movement target position of the first focus lens; determines a positional relationship of the first target position with respect to the first tracking data, based on the first tracking data and the position of the zoom lens; determines a second target position based on the positional relationship of the first target position, the second tracking data, and the position of the zoom lens, the second target position being a movement target position of the second focus lens; and controls the first driver to allow the first focus lens to move to the first target position, and controls the second driver to allow the second focus lens to move to the second target position.

According to the lens control apparatus according to the aspect, when the zoom lens is driven in a focus state, the first and second focus lenses are driven based on the first and second tracking data. By this, zoom tracking can be performed and excellent optical properties can be obtained at subject distances in a wider range than that for the case of a single focus lens.

DETAILED DESCRIPTION OF PREFERRED EMBODIMENTS

In focusing by a single focus lens group, a focus position is present at one point in a drive range of the focus lens group, but excellent optical properties (peripheral resolution, aberration, etc.) are not always obtained at the focus position.

To solve this problem, in one embodiment, zoom tracking operation by a plurality of focus lens groups is performed. By applying a configuration to be able to drive each of a plurality of focus lens groups, flexibility in the design of zoom tracking curves of each focus lens group increases. That is, zoom tracking curves for obtaining a focus state and excellent optical properties can be designed in advance. By this, a focus position is allowed to follow with zoom operation and excellent optical images can be obtained.

One embodiment will be described below with reference to the accompanying drawings. As the embodiment, a digital camera is shown as an example.

<1. Configuration of a Digital Camera>

Figure 1:
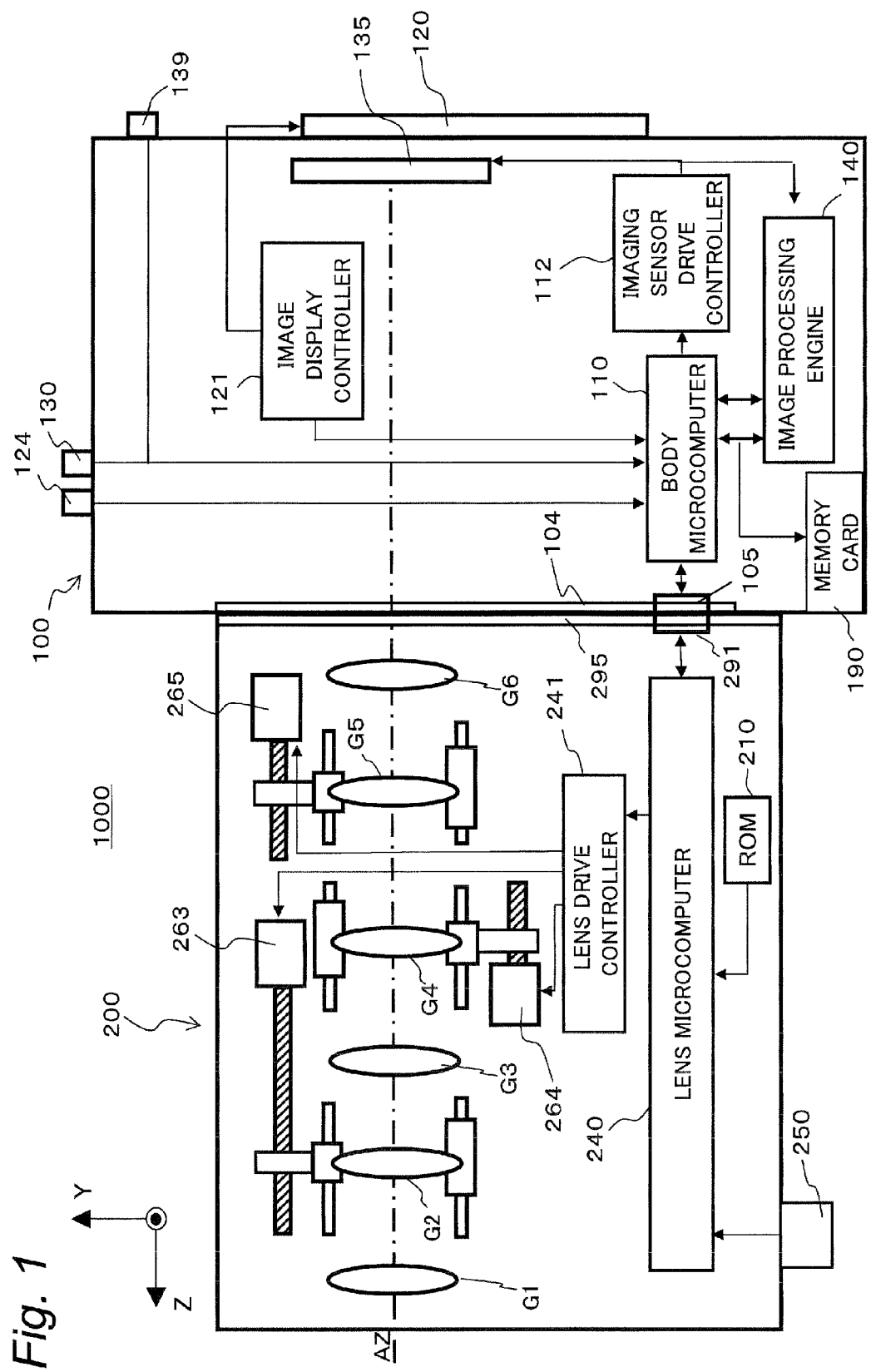
FIG. 1 is a configuration diagram of a digital camera of one embodiment.

Referring to FIG. 1, a configuration of a digital camera of one embodiment will be described. A digital camera 1000 is an interchangeable lens type digital camera. The digital camera 1000 includes a camera body 100 and an interchangeable lens 200 detachably attached to the camera body 100.

<1-1. Configuration of the Camera Body>

A configuration of the camera body 100 will be described. The camera body 100 includes a body mount 104, a body-side communication unit 105, a body microcomputer 110, an image processing engine 140, an imaging sensor drive controller 112, an imaging sensor 135, an image display controller 121, a display unit 120, a card slot that can allow a memory card 190 to be inserted and removed thereinto/from, a release button 130, a moving image shooting operation button 124, and a menu operation button 139.

The body-side communication unit 105 and a lens-side communication unit 291 (described later) can perform data communication with each other. Communication data includes, for example, lens specific data (image magnification change data, etc.), a focus drive control signal, an exposure synchronizing signal, information indicating whether a moving image is being recorded, zoom position information, focus position information, etc.

The body microcomputer 110 generates various types of control signals by obtaining those communication data through the body-side communication unit 105 and the lens-side communication unit 291.

The imaging sensor 135 is a sensor that converts an optical image formed through an optical system of the interchangeable lens 200 into an electrical signal and thereby generates image data. The image data generated by the imaging sensor 135 is outputted to the image processing engine 140 and is subjected to various image processing by the image processing engine 140. The imaging sensor drive controller 112 generates a timing signal for performing drive control of the imaging sensor 135.

The image processing engine 140 can perform various image processing on the image data outputted from the imaging sensor 135, such as a YC conversion process, a white balance correction process, a gamma correction process, an image zoom in/out process, an image compression/decompression process, and a focus determination process by detection of a contrast value. The image data processed by the image processing engine 140 is recorded in the memory card 190 or is displayed on the image display unit 120 through the image display controller 121.

The image display unit 120 plays back and displays a live monitor image, images recorded in the memory card 190, etc. The image display controller 121 provides instructions to the image display unit 120 to allow the image display unit 120 to display these images.

The memory card 190 saves still image data and moving image data generated by the imaging sensor 135. The body microcomputer 110 can perform the process of writing and reading various types of data to/from the memory card 190 through the card slot.

On the top of the camera body 100 are mounted the release button 130 and the moving image shooting operation button 124. When these buttons are operated, shooting corresponding to the respective buttons is performed. The release button 130 has two pressing states: a half-press state where it is pressed lightly and a full-press state where it is pressed heavily. When the release button 130 is placed in a half-press state by a user, the body microcomputer 110 performs autofocus control to bring a subject into focus. When the release button 130 is subsequently placed in a full-press state, still image data generated by the imaging sensor 135 is recorded in the memory card 190 at the timing at which the release button 130 is placed in the full-press state.

When the moving image shooting operation button 124 is pressed, the body microcomputer 110 records moving image data generated by the imaging sensor 135 in the memory card 190. That is, when the moving image shooting operation button 124 accepts operation performed by the user, the body microcomputer 110 performs various types of operation for moving image recording.

The menu operation button 139 is a button for enabling various camera settings by accepting user operation.

The body microcomputer 110 is a control apparatus that takes control of the main part of the camera body 100. The body microcomputer 110 detects operation performed on the release button 130, the moving image shooting operation button 124, the menu operation button 139, etc., and performs control according to the detected operation. In addition, the body microcomputer 110 detects attachment of the interchangeable lens 200 to the camera body 100. The body microcomputer 110 obtains information required to control the digital camera 1000 (zoom lens position information, focus lens position information, etc.) from the interchangeable lens 200. Furthermore, the body microcomputer 110 sends control signals for controlling a zoom lens group G2, a first focus lens group G4 (described later), etc., to a lens microcomputer 240 (described later).

Note that the digital camera 1000 of the present embodiment adopts, as an autofocus scheme, a contrast detection scheme that uses image data generated by the imaging sensor 135. By using the contrast detection scheme, high precision focus adjustment can be achieved.

<1-2. Configuration of the Interchangeable Lens>

A configuration of the interchangeable lens 200 will be described.

The interchangeable lens 200 includes a lens mount 295, the lens-side communication unit 291, the lens microcomputer 240, a first fixed lens group G1, the zoom lens group G2, a second fixed lens group G3, the first focus lens group G4, a second focus lens group G5, a third fixed lens group G6, a zoom motor 263, a first focus motor 264, a second focus motor 265, a lens drive controller 241, a ROM 210, and a zoom operation unit 250. The lens microcomputer 240, the zoom motor 263, the first focus motor 264, the second focus motor 265, the lens drive controller 241, and the ROM 210 compose a lens controller.

The interchangeable lens 200 is coupled to the body mount 104 mounted on the front of the camera body 100, by means of the lens mount 295. By the interchangeable lens 200 coupled to the camera body 100, the lens microcomputer 240 becomes able to communicate with the body microcomputer 110 through the lens-side communication unit 291 and the body-side communication unit 105.

The interchangeable lens 200 changes focal length by moving the zoom lens group G2 in an optical axis direction. In addition, the interchangeable lens 200 changes shooting distance (object distance) by moving the first focus lens group G4 and the second focus lens group G5 in the optical axis direction.

The zoom motor 263, the first focus motor 264, and the second focus motor 265 respectively drive the zoom lens group G2, the first focus lens group G4, and the second focus lens group G5. In particular, the lens groups G2, G4, and G5 can be driven independently of one another by the lens microcomputer 240 providing instructions to the motors 263, 264, and 265 through the lens drive controller 241. Note that the zoom motor 263, the first focus motor 264, and the second focus motor 265 can be implemented by, for example, stepping motors.

The lens microcomputer 240 first detects starting positions (described later) of the zoom lens group G2, the first focus lens group G4, and the second focus lens group G5. Then, the lens microcomputer 240 grasps the drive positions of the lens groups G2, G4, and G5, according to the number of steps instructed by the lens microcomputer 240 to the lens drive controller 241.

Figure 2:
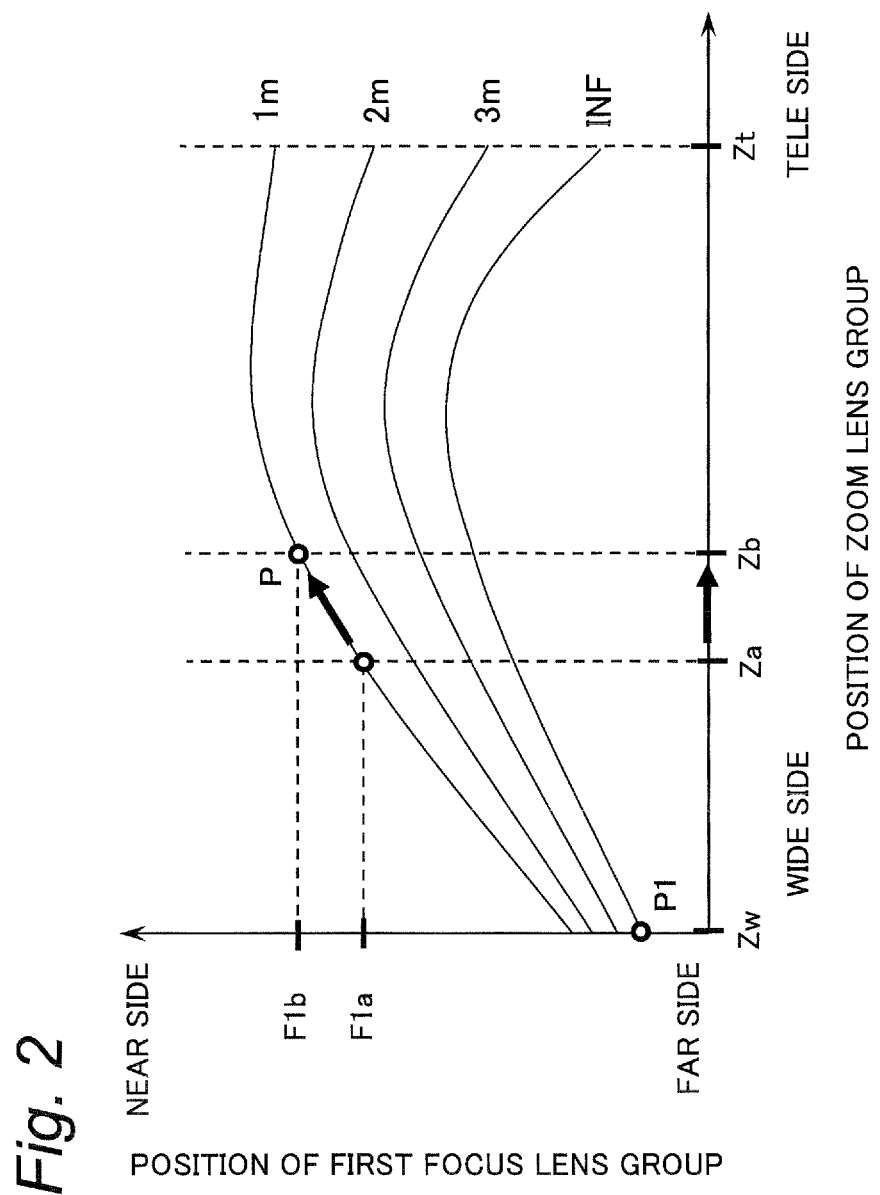
FIG. 2 is a diagram showing first tracking data for a first focus lens group.
Figure 3:
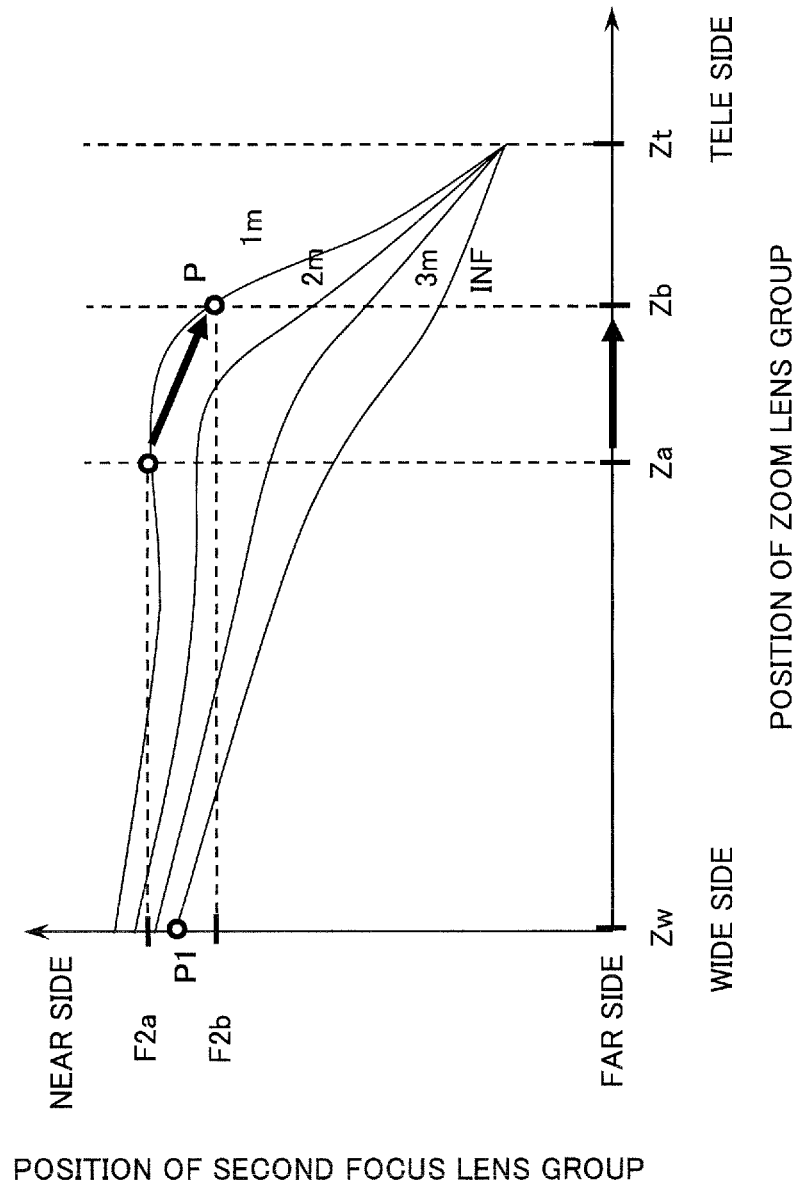
FIG. 3 is a diagram showing second tracking data for a second focus lens group.

The lens microcomputer 240 stores in advance tracking data for the first focus lens group G4 such as that shown in FIG. 2 and tracking data for the second focus lens group G5 such as that shown in FIG. 3, in the ROM 210 in the interchangeable lens 200. The "tracking data" is information including information (zoom tracking curves) indicating the positions to which the focus lens groups G4 and G5 are to move so as to maintain a focus state when the zoom lens group G2 moves. The tracking data for the first focus lens group G4 is hereinafter referred to as "first tracking data" and the tracking data for the second focus lens group G5 is hereinafter referred to as "second tracking data".

The lens microcomputer 240 reads the first tracking data and the second tracking data from the ROM 210 when necessary, and performs tracking control of the first focus lens group G4 and the second focus lens group G5 according to these tracking curves.

Referring to FIGS. 2 and 3, the first tracking data and the second tracking data will be described. In the graphs of FIGS. 2 and 3, the horizontal axes represent the drive position of the zoom lens group G2 and the vertical axes represent the drive positions of the first and second focus lens groups G4 and G5. The left side (Wide side) of the horizontal axis indicates the wide zoom side and the right side (Tele side) indicates the telephoto zoom side. Position Zw on the horizontal axis indicates a limit value (Wide end) settable on the Wide side of the zoom lens group G2, and position Zt indicates a limit value (Tele end) settable on the telephoto side of the zoom lens group G2.

As shown in FIGS. 2 and 3, each of the first tracking data and the second tracking data has four tracking curves. Four tracking curves of the first tracking data respectively show tracking data for when the subject distance is 1 m, 2 m, 3 m, and infinity (INF). Four tracking curves of the second tracking data also respectively show tracking data for when the subject distance is 1 m, 2 m, 3 m, and infinity (INF). As such, the four tracking curves included in the second tracking data respectively correspond in terms of subject distance to the four tracking curves included in the first tracking data. In addition, the number of tracking curves of the second tracking data is the same as that of the first tracking data. Note, however, that in the zoom position from the Wide end to the Tele end, the zoom tracking curves drawn by the second tracking data (FIG. 3) may differ from the zoom tracking curves drawn by the first tracking data (FIG. 2). The first tracking data and the second tracking data are appropriately designed so that zoom tracking operation can be performed by using the first focus lens group G4 and the second focus lens group G5 and more ideal optical properties can be obtained. For example, a tracking curve for when the subject distance is 1 m is hereinafter referred to as a "tracking curve (1 m)". The same also applies to other tracking curves.

The manner in which to interpret and understand the tracking data is as follows. For example, it is assumed that a subject with a subject distance of 1 m is in focus when the current position of the zoom lens group G2 is position Za in FIG. 2 and the current position of the first focus lens group G4 is F1a. At this time, when the zoom lens group G2 is driven to position Zb, the first focus lens group G4 is driven to F1b so as to maintain the focus state. That is, operating position P which is determined by the drive position of the zoom lens group G2 and the drive position of the first focus lens group G4 moves along the tracking curve (1 m) according to the drive position of the zoom lens group G2. The same also applies to the second tracking data such as that shown in FIG. 3.

Figure 4:
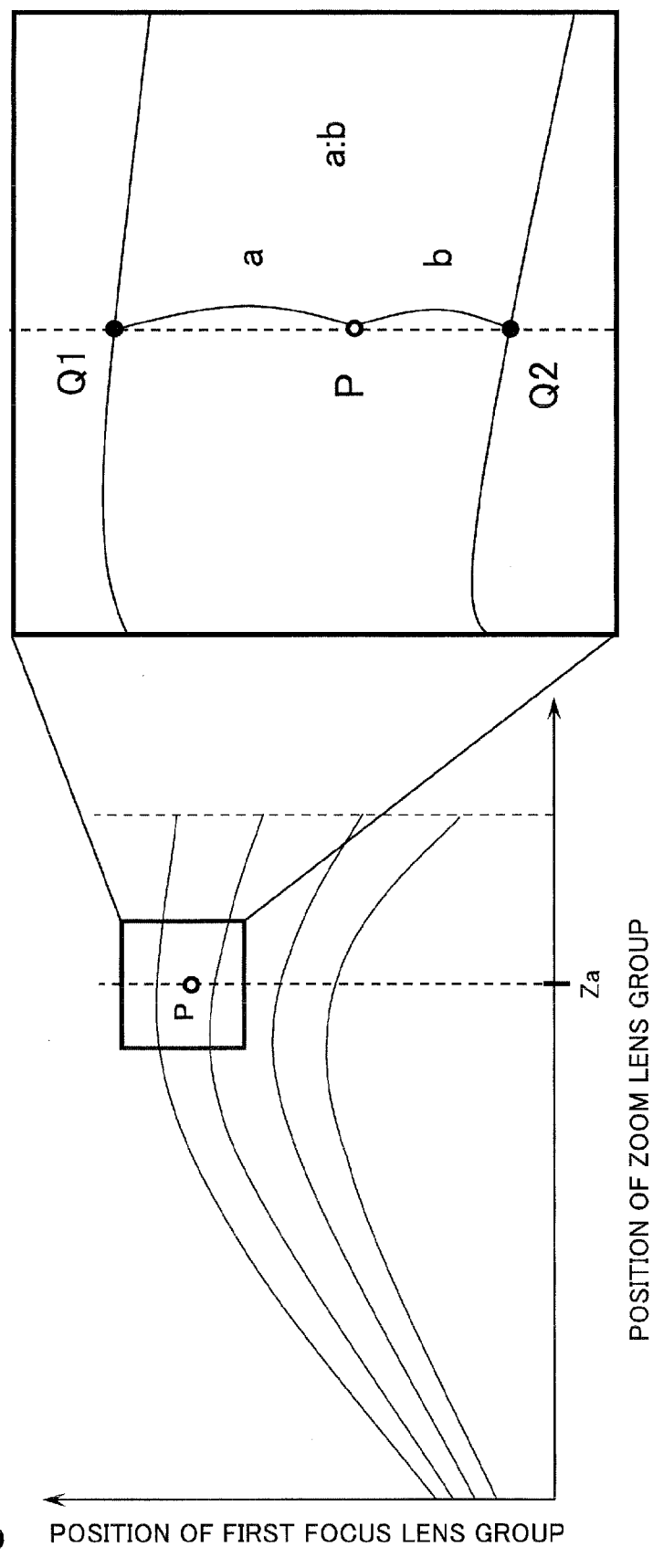
FIG. 4 is a diagram for describing a ratio of the position of a focus lens group with respect to tracking curves.

Operating position P may not be present on any of the tracking curves, depending on the drive positions of the zoom lens group G2 and the focus lens groups G4 and G5. In that case, the lens microcomputer 240 of the present embodiment grasps the position of operating position P based on a finite number of tracking curves, by a ratio between the distances from tracking curves. The ratio between the distances from tracking curves is calculated based on tracking data shown in FIG. 4, from distances a and b from operating position P to each of two tracking curves present to sandwich operating position P. Based on the calculated ratio between the distances (a:b), the drive positions of the first focus lens group G4 and the second focus lens group G5 are determined.

Note that although in the present embodiment each tracking data has four tracking curves, each tracking data may have tracking curves of a number other than 4.

When the zoom operation unit 250 accepts user operation, the lens microcomputer 240 detects the direction and amount of the operation. Based on the detection results, the lens microcomputer 240 determines a zoom target position which is a target to move to of the zoom lens group G2. Then, the lens microcomputer 240 outputs a control signal for allowing the zoom lens group G2 to move to the zoom target position, to the lens drive controller 241. According to the control signal, the zoom motor 263 drives the zoom lens group G2 to the zoom target position. Note that the zoom operation unit 250 may be in the form of a lever or may be in the form of a switch or may be ring-shaped.

Figure 5:
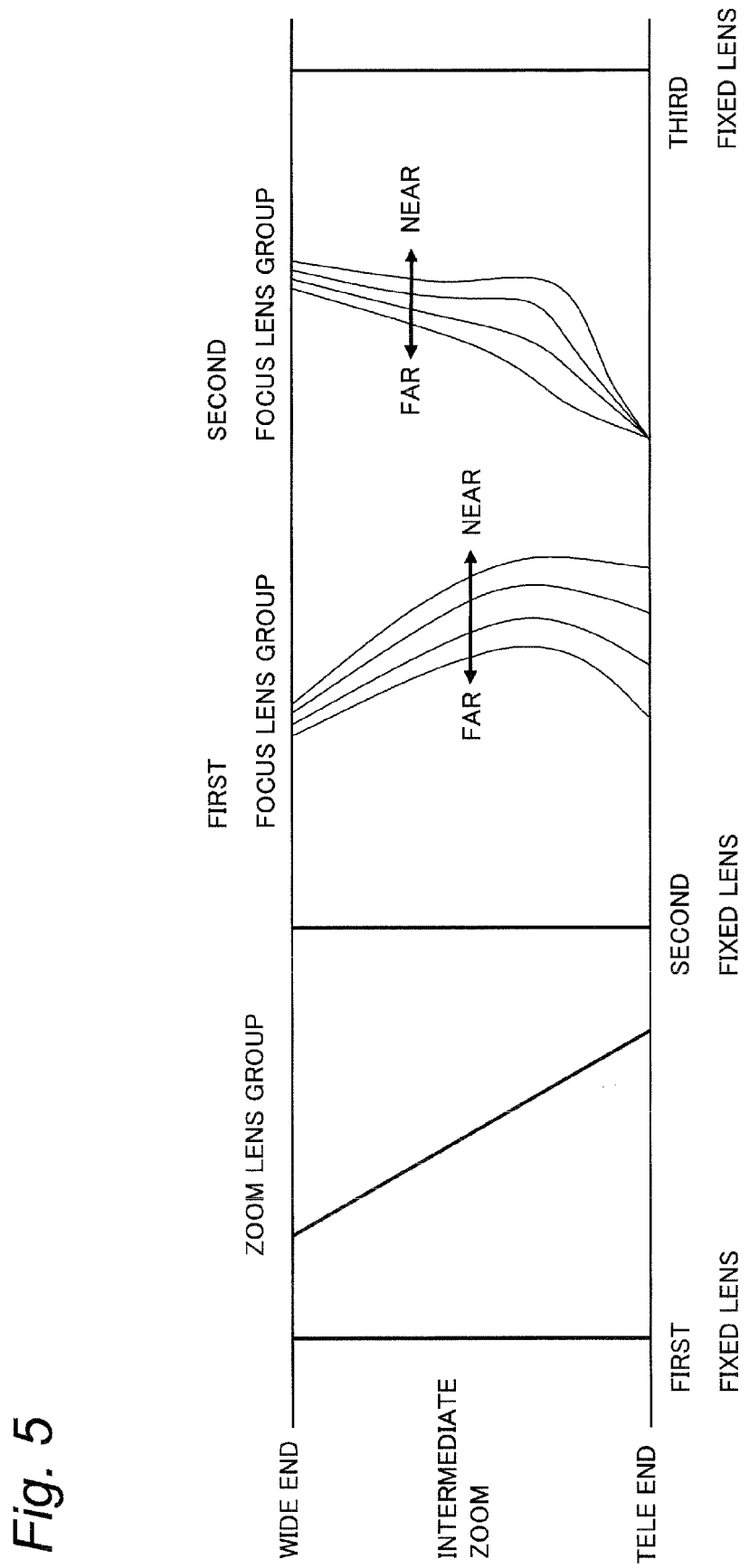
FIG. 5 is a diagram for describing the position of each lens group during zoom operation.

Referring to FIG. 5, movement of each lens group of the interchangeable lens 200 during zoom operation will be described. In FIG. 5, the vertical axis represents the level of zoom in a zoom range from the Wide end to Tele end of the zoom lens group G2. The horizontal axis represents the position of each lens group.

As shown in FIG. 5, the zoom can be set in the range from the Wide end to the Tele end, according to operation accepted by the zoom operation unit 250. For example, when the zoom is changed from the Wide end to the Tele end, the zoom lens group G2 moves to the right side in FIG. 5. At this time, even though the zoom lens group G2 moves, the first fixed lens group G1, the second fixed lens group G3, and the third fixed lens group G6 do not move. This is because the fixed lens groups G1, G3, and 06 are fixed lens groups. On the other hand, the first focus lens group G4 and the second focus lens group G5 move with the movement of the zoom lens group G2 according to tracking curves shown in FIG. 5, so as to maintain a focus state. In particular, the interchangeable lens 200 of the present embodiment performs zoom tracking operation by individually driving a plurality of focus lens groups (the first focus lens group G4 and the second focus lens group G5) instead of driving a single focus lens group.

In focusing by a single focus lens group, a focus position is present at one point in a drive range of the focus lens group, but excellent optical properties (peripheral resolution, aberration, etc.) are not always obtained at the focus position.

However, by using a plurality of focus lens groups, flexibility in the design of zoom tracking curves of each focus lens group increases. That is, zoom tracking curves for obtaining a focus state and excellent optical properties can be designed in advance. By this, a focus position is allowed to follow with zoom operation and excellent optical images can be obtained.

The lens microcomputer 240 outputs the position of either one of the first focus lens group G4 and the second focus lens group G5 to the body microcomputer 110 as current focus position information. By this, the body microcomputer 110 can provide a focus control instruction to the lens microcomputer 240 without regard to the number of focus lens groups in the interchangeable lens 200.

Note that in the present embodiment the position of the first focus lens group G4 is sent to the body microcomputer 110 as focus position information. This is because the moving range (the width of movement trajectory) of the first focus lens group G4 for zoom operation is larger than that of the second focus lens group G5 (see FIGS. 2 and 3). If the moving range is large, then the first focus motor 264 that drives the first focus lens group G4 can drive with a larger number of steps, resulting in an increase in the accuracy of grasping the drive position (focus lens position) of the first focus lens group G4 between tracking data. Based on the drive position of the first focus lens group G4 thus grasped, the drive position of the second focus lens group G5 is accurately determined. Determination of the drive position of the second focus lens group G5 will be described later.

Note that upon zoom tracking operation, the moving range of the first focus lens group G4 is larger than that of the second focus lens group G5. However, as described above, tracking data that determines the position of each focus lens group can be appropriately designed. Therefore, tracking data where the moving range of the second focus lens group G5 is larger than that of the first focus lens group G4 may be designed. In that case, the lens microcomputer 240 outputs the focus position of the second focus lens group G5 to the body microcomputer 110 as focus position information.

<2. Operation of the Digital Camera>

The operation of the digital camera 1000 will be described below.

<2-1. Reset Operation for the Lens Groups>

Figure 6:
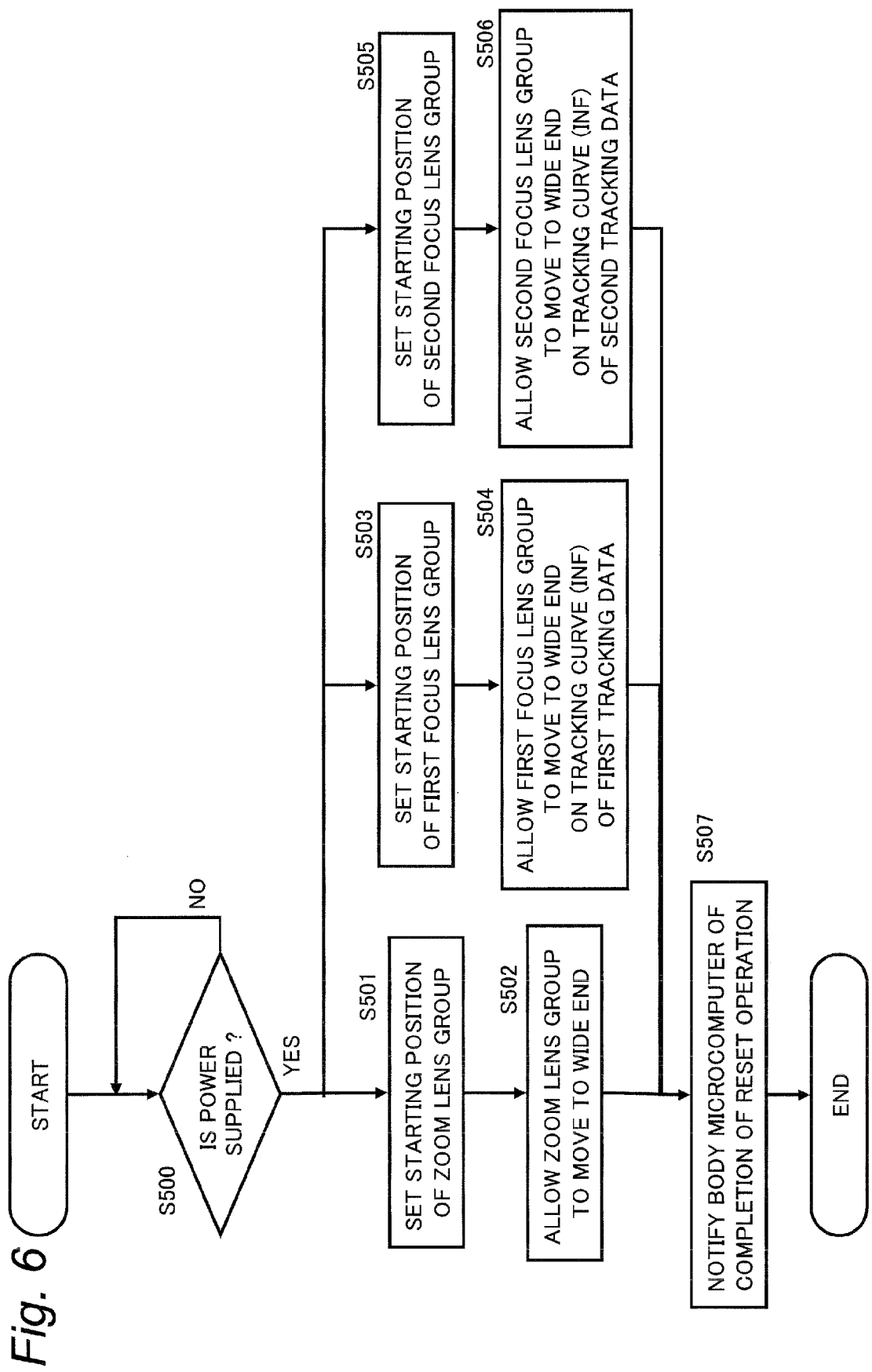
FIG. 6 is a flowchart for describing reset operation for each lens group.

Referring to FIG. 6, reset operation for the lens groups G2, G4, and G5 of the interchangeable lens 200 will be described.

When the power supply to the camera body 100 is switched to an ON state, the body microcomputer 110 activates a system for performing initial operation and supplies power to each component of the camera body 100. In addition, the body microcomputer 110 supplies power to each component of the interchangeable lens 200 through the body mount 104 and the lens mount 295.

Note that the power supply is described as being included in the camera body 100 but may be included in the interchangeable lens 200.

When power is supplied to the lens microcomputer 240 (Yes at step S500), the lens microcomputer 240 performs reset operation for the zoom lens group G2, the first focus lens group G4, and the second focus lens group G5. Reset operation for each lens group will be described below.

First, reset operation for the zoom lens group G2 will be described. The lens microcomputer 240 outputs a control signal for reset operation to the lens drive controller 241. Based on the control signal, the lens drive controller 241 controls the zoom motor 263 to allow the zoom lens group G2 to move in a predetermined direction. A photo interrupter is mounted along a moving axis of the zoom lens group G2. The lens microcomputer 240 grasps an absolute position of the zoom lens group G2 by detecting that the zoom lens group G2 has passed through the front of the photo interrupter. The lens microcomputer 240 having grasped the absolute position of the zoom lens group G2 sets a position distant by a predetermined distance from the absolute position, as a starting position for zoom operation of the zoom lens group G2 (S501). After setting the starting position, the lens microcomputer 240 grasps a current position of the zoom lens group G2 according to the number of steps by which the zoom motor 263 drives the zoom lens group G2 from the starting position. After setting the starting position of the zoom lens group G2, the lens microcomputer 240 allows the zoom lens group G2 to move to the Wide end as an initial position for power-on (S502).

Next, reset operation for the first focus lens group G4 will be described. The lens drive controller 241 controls the focus motor 264 to allow the first focus lens group G4 to move in a predetermined direction, based on a control signal for reset operation which is outputted from the lens microcomputer 240. A photo interrupter is mounted along a moving axis of the first focus lens group G4. The lens microcomputer 240 grasps an absolute position of the first focus lens group G4 by detecting that the first focus lens group G4 has passed through the front of the photo interrupter. The lens microcomputer 240 having grasped the absolute position of the first focus lens group G4 sets a position distant by a predetermined distance from the absolute position, as a starting position for focus operation of the first focus lens group G4 (S503). After setting the starting position, the lens microcomputer 240 grasps a current position of the first focus lens group G4 according to the number of steps by which the focus motor 264 drives the first focus lens group G4 from the starting position. Then, the lens microcomputer 240 obtains first tracking data for the first focus lens group G4 and allows the first focus lens group G4 to move to the position of the Wide end on a tracking curve (INF) indicating a subject distance for infinity (INF) (the position P1 in FIG. 2), as an initial position for power-on (S504).

Reset operation for the second focus lens group G5 is performed in the same manner as that of the reset operation for the first focus lens group G4. Specifically, when a starting position of the second focus lens group G5 is set (S505), the second focus lens group G5 is allowed to move to a position corresponding to the Wide end on a tracking curve (INF) of second tracking data (the position P1 in FIG. 3) (S506).

When the reset operation for the zoom lens group G2, the first focus lens group G4, and the second focus lens group G5 is completed in the above-described manner, the lens microcomputer 240 outputs a signal indicating completion of the reset operation, to the body microcomputer 110 (S507).

<2-2. Zoom Tracking Operation>

Figure 7:
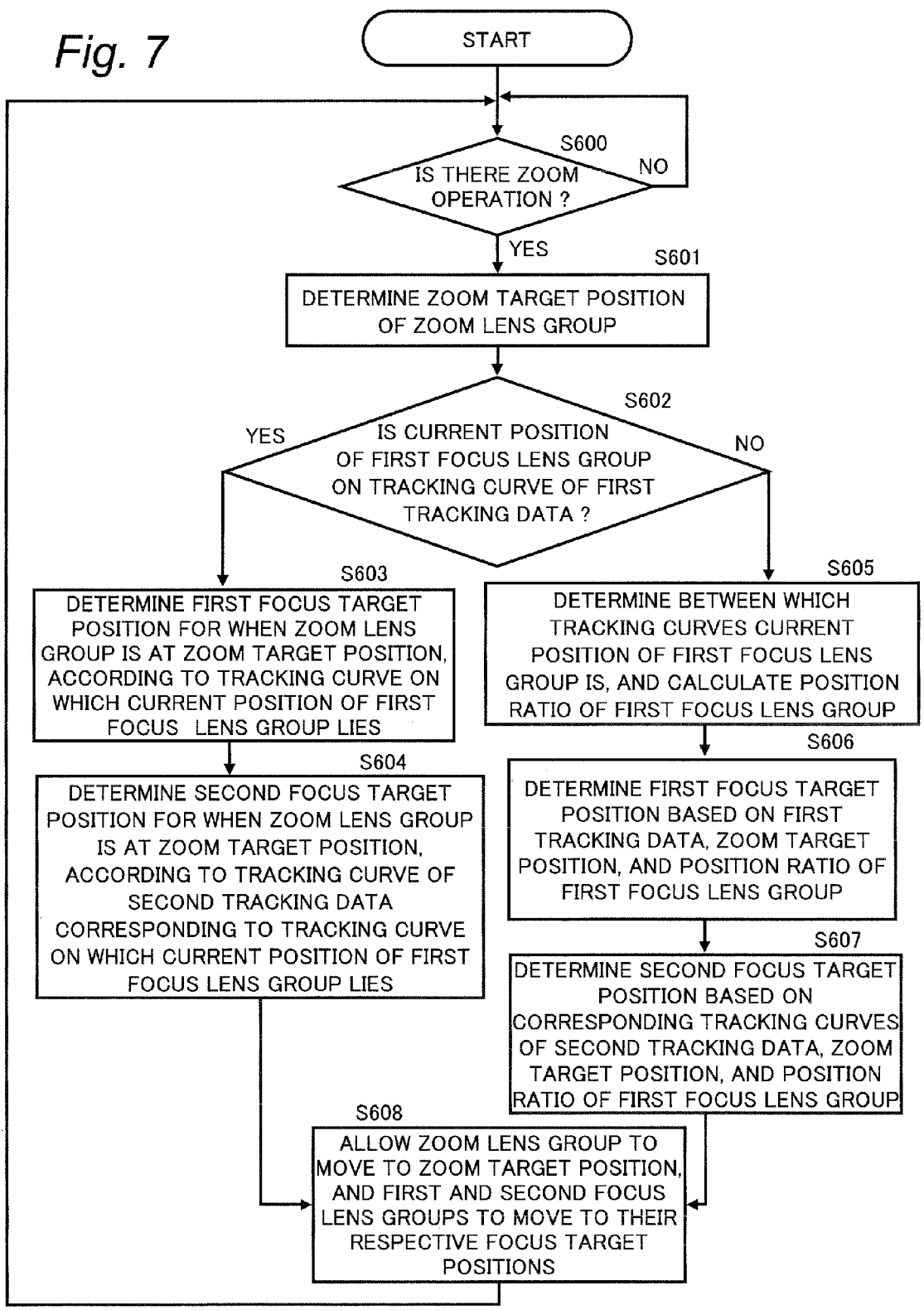
FIG. 7 is a flowchart for describing zoom tracking operation performed during zoom operation.

Referring to FIG. 7, zoom tracking operation of each focus lens group performed with zoom operation of the zoom lens group G2 will be described.

After the above-described reset operation is completed, the lens microcomputer 240 monitors an operation state of the zoom operation unit 250 (S600). When the zoom operation unit 250 accepts operation (Yes at step S600), the lens microcomputer 240 detects the direction and amount of the operation.

Based on the detected direction and amount of the operation, the lens microcomputer 240 determines a zoom target position (S601). When the detected direction of the operation indicates zoom in a Tele-end direction, the lens microcomputer 240 determines in a zoom target position the Tele-end direction. A distance from a current zoom position to the zoom target position is determined according to the detected amount of the operation. On the other hand, when the detected direction of the operation indicates zoom in a Wide-end direction, the lens microcomputer 240 determines in a zoom target position the Wide-end direction. A distance from a current zoom position to the zoom target position is determined according to the detected amount of the operation.

When the zoom target position of the zoom lens group G2 is determined, the lens microcomputer 240 determines, according to the zoom target position, a focus target position of the first focus lens group G4 and one of the second focus lens group G5, using first tracking data and second tracking data. The focus target positions are positions to which the focus lens groups G4 and G5 are allowed to move. The focus target position of the first focus lens group G4 is hereinafter referred to as a "first focus target position" and the focus target position of the second focus lens group G5 is hereinafter referred to as a "second focus target position". A specific method of determining the first and second focus target positions will be described below.

<2-2-1. When the Current Position of the Focus Lens Group is on a Tracking Curve>

The lens microcomputer 240 determines whether the current position of the first focus lens group G4 is on a tracking curve of the first tracking data (S602). If the lens microcomputer 240 determines that the current position of the first focus lens group G4 is on any of the tracking curves of the first tracking data (Yes at step S602), then the lens microcomputer 240 determines a first focus target position for when the zoom lens group G2 is at the zoom target position, according to the tracking curve on which the current position of the first focus lens group G4 lies (S603).

Then, the lens microcomputer 240 selects one of the four tracking curves of the second tracking data that corresponds to the tracking curve of the first tracking data on which the current position of the first focus lens group G4 lies. For example, when the current position of the first focus lens group G4 lies on a tracking curve (2 m) of the first tracking data, the lens microcomputer 240 selects a tracking curve (2 m) of the second tracking data. Then, the lens microcomputer 240 determines a second focus target position for when the zoom lens group G2 is at the zoom target position, according to the selected tracking curve of the second tracking data (S604).

When the zoom target position of the zoom lens group G2, the first focus target position, and the second focus target position are determined in the above-described manner, the lens microcomputer 240 allows the zoom lens group G2, the first focus lens group G4, and the second focus lens group G5 to move to their respective target positions through the lens drive controller 241 and the lens motors 263, 264, and 265 (S608).

When the lens groups are allowed to move to their respective target positions, the lens microcomputer 240 returns to a state of monitoring whether the zoom operation unit 250 accepts operation (S600). By the lens microcomputer 240 monitoring the zoom operation unit 250, the lens microcomputer 240 periodically repeats operation described with reference to the flowchart of FIG. 7 (steps S600 to S608), according to the direction and amount of operation accepted by the zoom operation unit 250.

By thus changing the positions of the first focus lens group G4 and the second focus lens group G5 in conjunction with the position of the zoom lens group G2, zoom operation with a focus state maintained can be performed.

Now, the above-described operation of the first focus lens group G4 and the second focus lens group G5 performed when the current position of the first focus lens group G4 is on a tracking curve will be described using a specific example.

Figure 8:
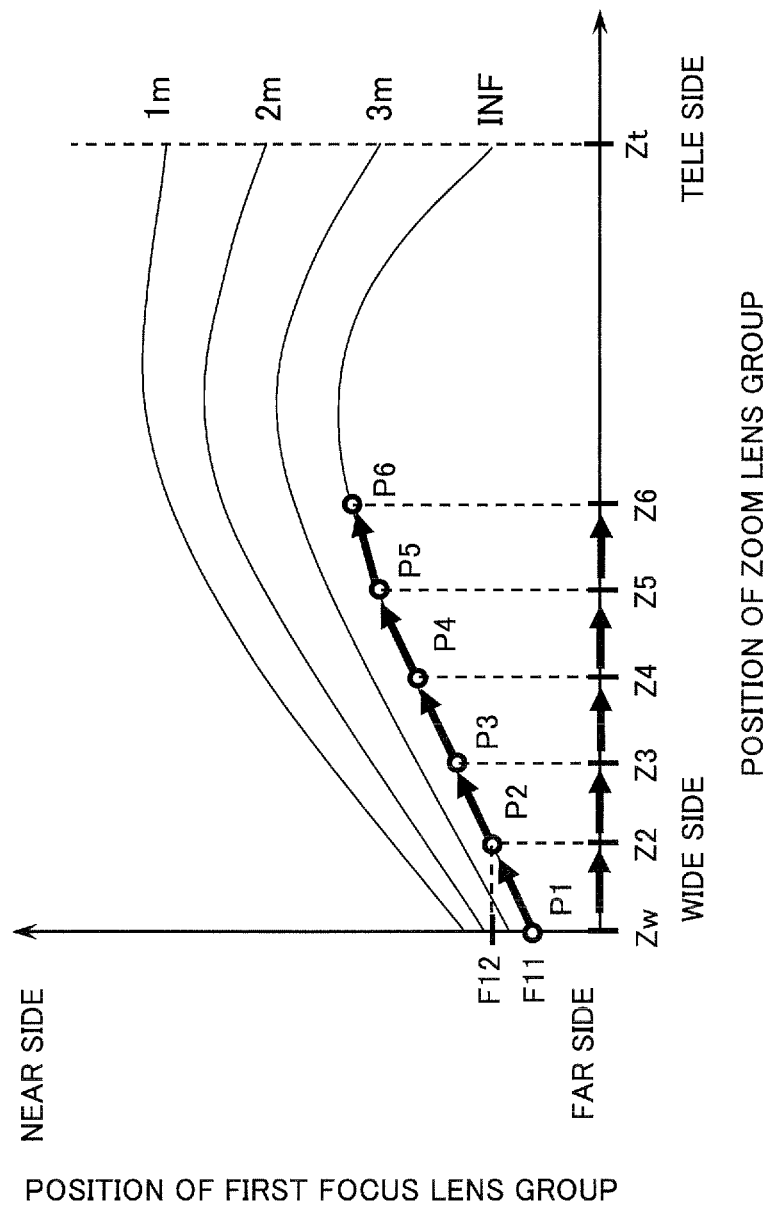
FIG. 8 is a diagram showing a change in the position of the first focus lens group for the case in which the first focus lens group is on a tracking curve, during zoom tracking operation.
Figure 9:
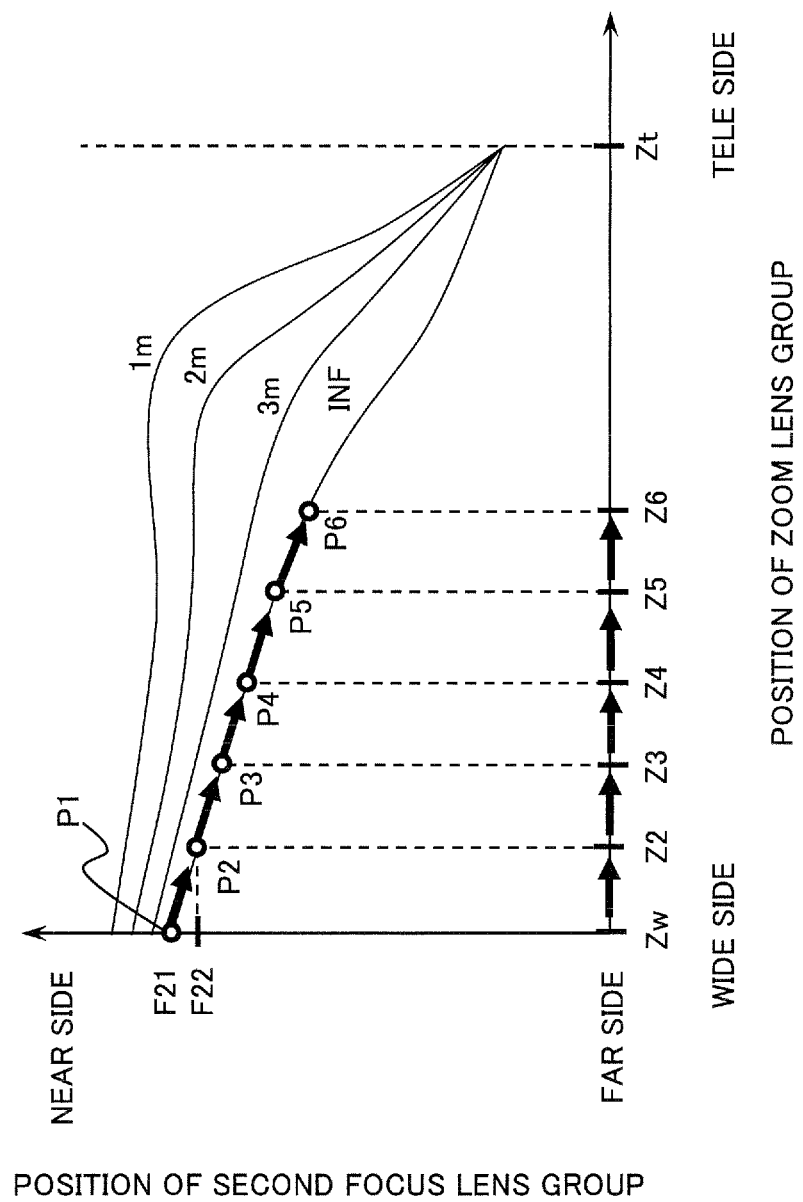
FIG. 9 is a diagram showing a change in the position of the second focus lens group for the case in which the first focus lens group is on a tracking curve, during the zoom tracking operation.

Referring to FIGS. 8 and 9, a specific example of the operation of the first focus lens group G4 and the second focus lens group G5 performed during zoom operation is shown. FIG. 8 shows first tracking data. The horizontal axis represents the position of the zoom lens group G2 and the vertical axis represents the position of the first focus lens group G4. FIG. 9 shows second tracking data. The horizontal axis in FIG. 9 represents the position of the zoom lens group G2 and the vertical axis represents the position of the second focus lens group G5.

In the example shown in FIGS. 8 and 9, it is assumed that as a result of the above-described reset operation, the current position of the zoom lens group G2 is position Zw, the current position of the first focus lens group G4 is position F11 (position P1) in FIG. 8, and the current position of the second focus lens group G5 is position F21 (position P1) in FIG. 9. In addition, it is assumed that a subject is in focus in this state.

In this state, when the zoom operation unit 250 accepts operation (Yes at step S600 in FIG. 7), the lens microcomputer 240 determines position Z2 as a zoom target position of the zoom lens group G2, according to the direction and amount of the accepted operation (S601).

Then, the lens microcomputer 240 reads first tracking data such as that shown in FIG. 8 from the ROM 210. In this example, since the current position of the first focus lens group G4 is on a tracking curve (INF), the lens microcomputer 240 determines that the current position of the first focus lens group G4 is on a tracking curve (Yes at step S602). In this case, the lens microcomputer 240 determines position P2 on the tracking curve (INF) associated with the zoom target position Z2, as a first focus target position (S603).

Subsequently, the lens microcomputer 240 reads second tracking data such as that shown in FIG. 9 from the ROM 210.

Then, based on a tracking curve of the second tracking data corresponding to the tracking curve of the first tracking data used to determine the first focus target position, the lens microcomputer 240 determines position P2 associated with the zoom target position Z2, as a second focus target position (S604).

When the target positions of the respective lens groups are thus determined, the lens microcomputer 240 allows the zoom lens group G2 to move to position Z2, the first focus lens group G4 to position F12, and the second focus lens group G5 to position F22 (S608).

Note that, in the following description, position P1 or P2 in the first and second tracking data is also referred to as the "position of the focus lens" (a current position or focus target position).

If zoom operation is further accepted after the movement of the lens groups, then zoom operation and zoom tracking operation such as those described above are continuously performed. By this, as shown in FIGS. 8 and 9, the zoom lens group G2 is allowed to move to position Z2→Z3→Z4→Z5→Z6 and the first focus lens group G4 and the second focus lens group G5 are allowed to move to position P2→P3→P4→P5→P6.

<2-2-2. When the Current Position of the Focus Lens Group is not on a Tracking Curve>

On the other hand, if it is determined that the current position of the first focus lens group G4 does not lie on any of the tracking curves of the first tracking data (No at step S602), then the lens microcomputer 240 calculates at what position the current position of the first focus lens group G4 is with respect to tracking curves, as follows.

The lens microcomputer 240 determines between which tracking curves of the first tracking data the current position of the first focus lens group G4 is. Then, using two tracking curves present to sandwich the current position of the first focus lens group G4, the lens microcomputer 240 calculates a ratio between the distances to the current position of the first focus lens group G4 (a:b) (S605). The ratio is hereinafter referred to as a "position ratio".

Subsequently, based on the calculated position ratio (a:b), the lens microcomputer 240 determines a first focus target position. Specifically, the lens microcomputer 240 selects two tracking curves used when calculating the position ratio. The lens microcomputer 240 obtains two positions of the first focus lens group G4 on the two tracking curves associated with the zoom target position. The lens microcomputer 240 determines a first focus target position such that a position ratio of the first focus target position with respect to the obtained two positions of the first focus lens group G4 is the same as the position ratio (a:b) calculated earlier (S606).

Subsequently, the lens microcomputer 240 determines a second focus target position in the same manner as that of the first focus target position. Specifically, the lens microcomputer 240 selects two tracking curves included in the second tracking data corresponding to the two tracking curves used to determine the first focus target position. Then, using the two tracking curves, the lens microcomputer 240 obtains two positions of the second focus lens group G5 associated with the zoom target position. The lens microcomputer 240 determines a second focus target position using the obtained two positions of the second focus lens group G5 and the position ratio (a:b) calculated earlier (S607).

The operation performed after determining the first and second focus target positions is the same as that for when the current position of the first focus lens group G4 is on a tracking curve of the first tracking data.

Now, the above-described operation of the first focus lens group G4 and the second focus lens group G5 performed when the current position of the first focus lens group G4 is not on a tracking curve will be described using a specific example.

Figure 10:
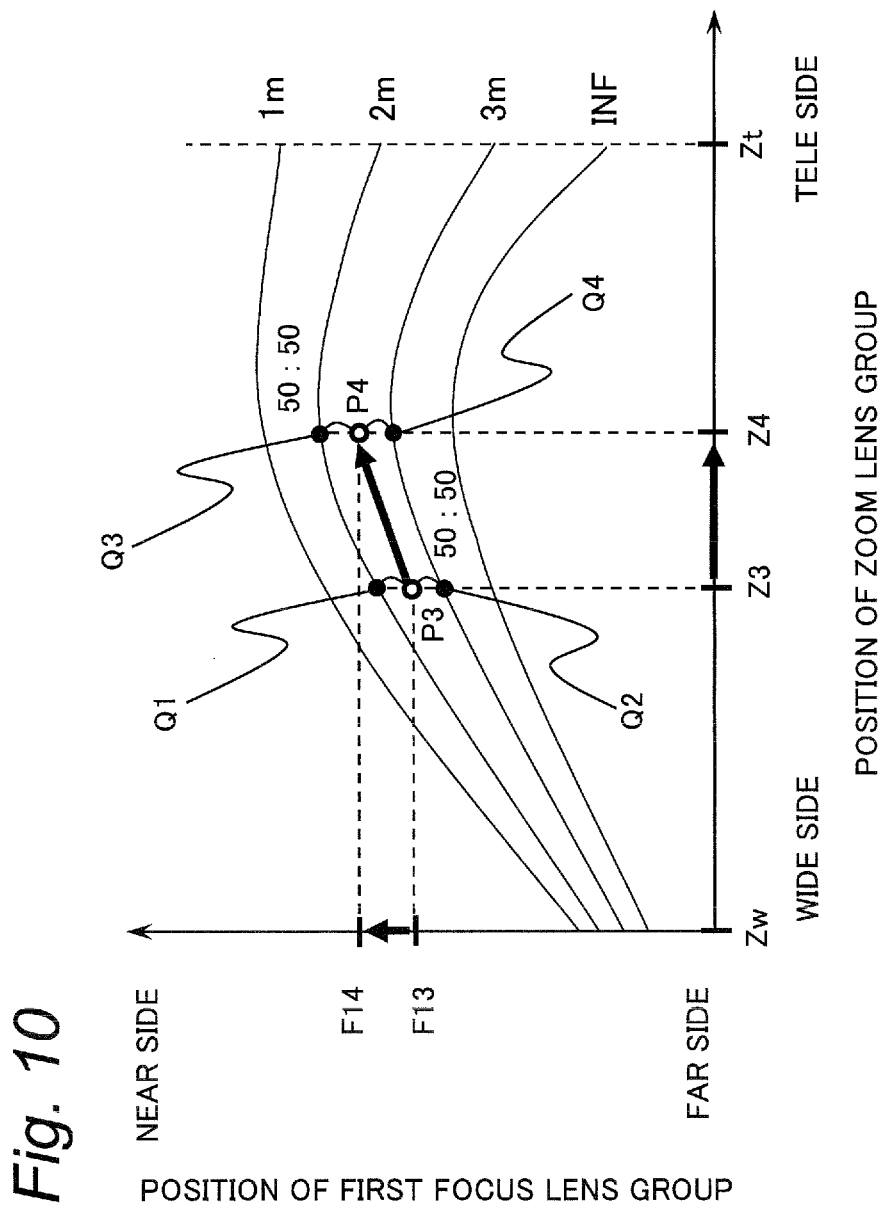
FIG. 10 is a diagram showing a change in the position of the first focus lens group for the case in which the first focus lens group is not on a tracking curve, during zoom tracking operation.
Figure 11:
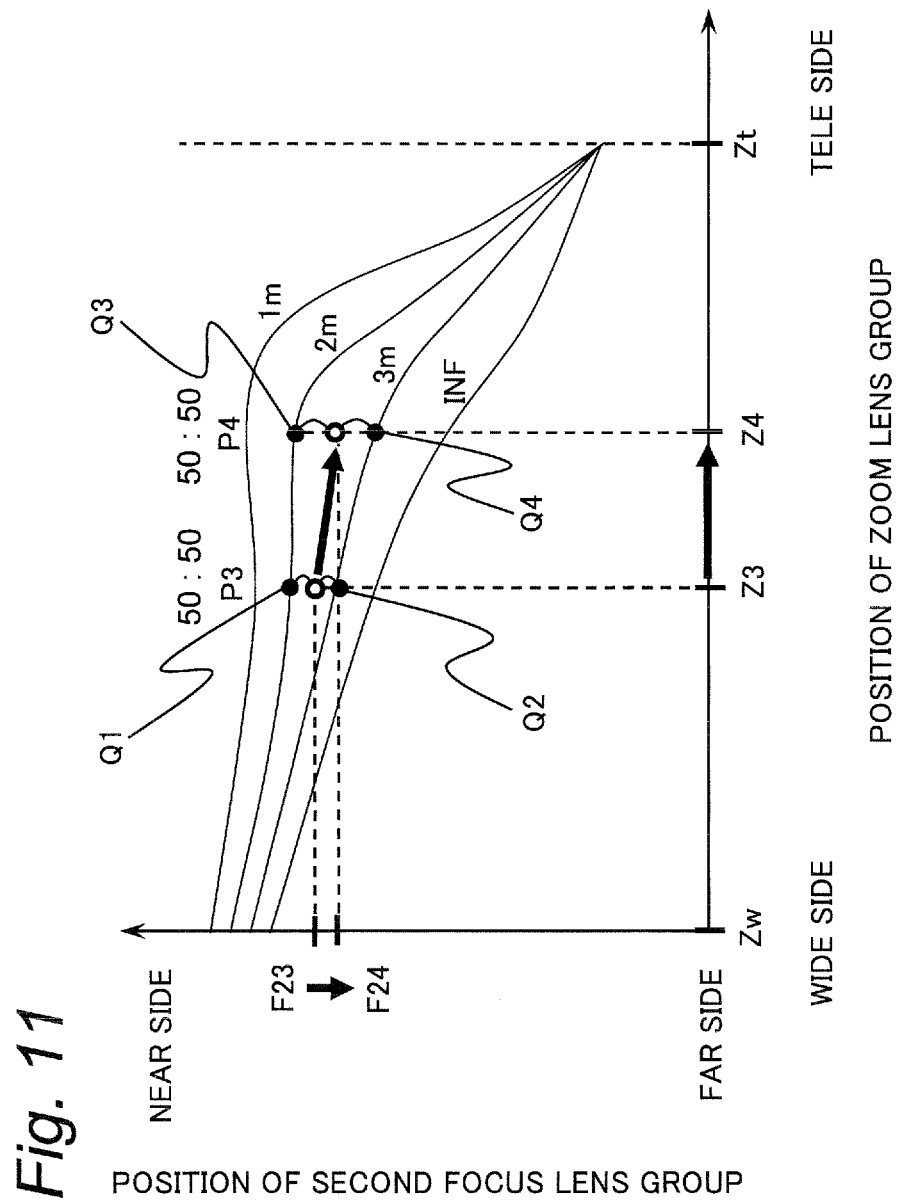
FIG. 11 is a diagram showing a change in the position of the second focus lens group for the case in which the first focus lens group is not on a tracking curve, during the zoom tracking operation.

Referring to FIGS. 10 and 11, a specific example of the zoom tracking operation of the first focus lens group G4 and the second focus lens group G5 is shown. FIG. 10 shows first tracking data. The horizontal and vertical axes are the same as those of the case of FIG. 8. FIG. 11 shows second tracking data. The horizontal and vertical axes in FIG. 11 are the same as those of the case of FIG. 9. In the example shown in FIGS. 10 and 11, it is assumed that the current position of the zoom lens group G2 is position Z3, the current position of the first focus lens group G4 is position F13 in FIG. 10, and the current position of the second focus lens group G5 is position F23 in FIG. 11. Then, it is assumed that a subject is in a focus state in this state.

In this state, when the zoom operation unit 250 accepts operation (Yes at step S600 in FIG. 7), the lens microcomputer 240 determines position Z4 as a zoom target position of the zoom lens group G2, according to the direction and amount of the accepted operation (S601). Then, the lens microcomputer 240 reads first tracking data such as that shown in FIG. 10 from the ROM 210. In this example, position P3 associated with the current position Z3 of the zoom lens group G2 and with the current position F13 of the first focus lens group G4 in the first tracking data is not present on any of the tracking curves. Thus, the lens microcomputer 240 determines that the current position of the first focus lens group G4 is not on a tracking curve (No at step S602).

In this case, the lens microcomputer 240 calculates, using tracking curves, a position ratio indicating the current position of the first focus lens group G4 as follows. First, the lens microcomputer 24C selects two tracking curves present to sandwich the current position P3 of the first focus lens group G4. In this example, a tracking curve (2 m) and a tracking curve (3 m) are selected. Then, the lens microcomputer 240 obtains positions Q1 and Q2 on the two tracking curves associated with the current position Z3 of the zoom lens group G2. Then, the lens microcomputer 240 calculates a ratio (position ratio) in which the current position P3 of the first focus lens group G4 internally divides the interval between position Q1 and Q2 (S605). In this example, the position ratio is 50:50.

Subsequently, the lens microcomputer 240 obtains positions Q3 and Q4 on the two tracking curves associated with the zoom target position Z4. Then, the lens microcomputer 240 determines a first focus target position P4 such that the first focus target position P4 internally divides the interval between the two positions Q3 and Q4 in the position ratio (50:50) calculated earlier. That is, position P4 (first focus target position) is determined such that a ratio in which position P3 internally divides the interval between positions Q1 and Q2 is equal to a ratio in which position P4 internally divides the interval between positions Q3 and Q4 (S606).

Subsequently, the lens microcomputer 240 reads second tracking data such as that shown in FIG. 11 from the ROM 210. The lens microcomputer 240 obtains positions Q3 and Q4 on a tracking curve (2 m) and a tracking curve (3 m) of the second tracking data that are associated with the zoom target position Z4. Here, in the second tracking data, the tracking curve (2 m) and the tracking curve (3 m) corresponding to the two tracking curves used for the first focus lens group G4 are used. Then, the lens microcomputer 240 determines a second focus target position P4 such that the second focus target position P4 internally divides the interval between the two positions Q3 and Q4 in the position ratio (50:50) calculated earlier (S607).

When the target positions of the respective lens groups are thus determined, the lens microcomputer 240 allows the zoom lens group G2 to move to position Z4, the first focus lens group G4 to position F14, and the second focus lens group G5 to position F24 (S608).

When the lens microcomputer 240 allows the lens groups to move to their respective target positions, the lens microcomputer 240 monitors again whether the zoom operation unit 250 has accepted operation (S600). Subsequent operation is the same as that described above (S600 to S608).

As such, even when the current position of the first focus lens group G4 is not on a tracking curve, by changing the positions of the first focus lens group G4 and the second focus lens group G5 in conjunction with the position of the zoom lens group G2, zoom tracking operation can be performed. At this time, tracking curves of the second tracking data used to determine a second focus target position correspond to tracking curves of the first tracking data used to determine a first focus target position. In addition, the second focus target position is determined such that a position ratio of the second focus target position with respect to two tracking curves of the second tracking data is the same as a position ratio of the first focus target position with respect to two tracking curves of the first tracking data.

The digital camera 1000 of the present embodiment performs zoom tracking operation during zoom operation in the above-described manner. Specifically, a first focus target position of the first focus lens group G4 is determined based on first tracking data and a zoom target position of the zoom lens group G2. Then, a second focus target position is determined based on a positional relationship of the first focus target position with respect to the first tracking data, second tracking data, and the zoom target position.

The digital camera 1000 of the present embodiment performs zoom tracking operation using a plurality of focus lens groups. By this, a focus state is maintained during zoom operation and excellent optical properties can be obtained in a moving range of the first focus lens group G4 which is wider than that of a camera that performs zoom tracking operation using a single focus lens group. Thus, optical images with excellent optical properties can be obtained at subject distances in a wider range than that of a camera that performs zoom tracking operation using a single focus lens group.

<2-3. Autofocus Operation>

Autofocus (AF) operation of the digital camera 1000 will be described below.

Figure 12:
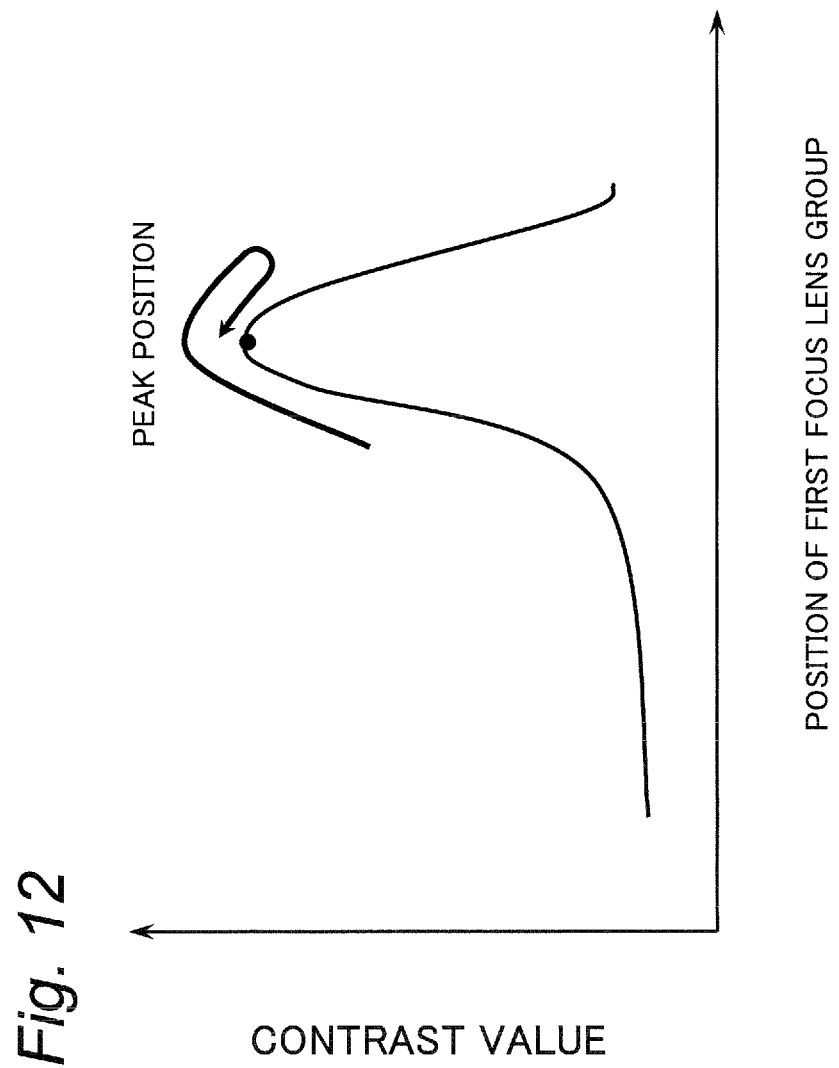
FIG. 12 is a diagram for describing a contrast AF scheme.

The digital camera 1000 of the present embodiment performs AF operation by a contrast AF scheme. Referring to FIG. 12, a method of determining a focus state will be described. In FIG. 12, the horizontal axis represents the position of the first focus lens group G4 and the vertical axis represents the contrast value. The body microcomputer 110 of the digital camera 1000 detects, as shown in FIG. 12, a contrast value of a subject image captured by the imaging sensor 135, while changing the position of each of the focus lens groups G4 and G5 by a predetermined distance. The body microcomputer 110 determines the positions of the focus lens groups G4 and G5 at which the maximum contrast value is obtained, as a focus position. Searching for the positions of the focus lens groups G4 and G5 at which the maximum contrast value is obtained in order to determine such a focus position is hereinafter referred to as "search operation".

Figure 13:
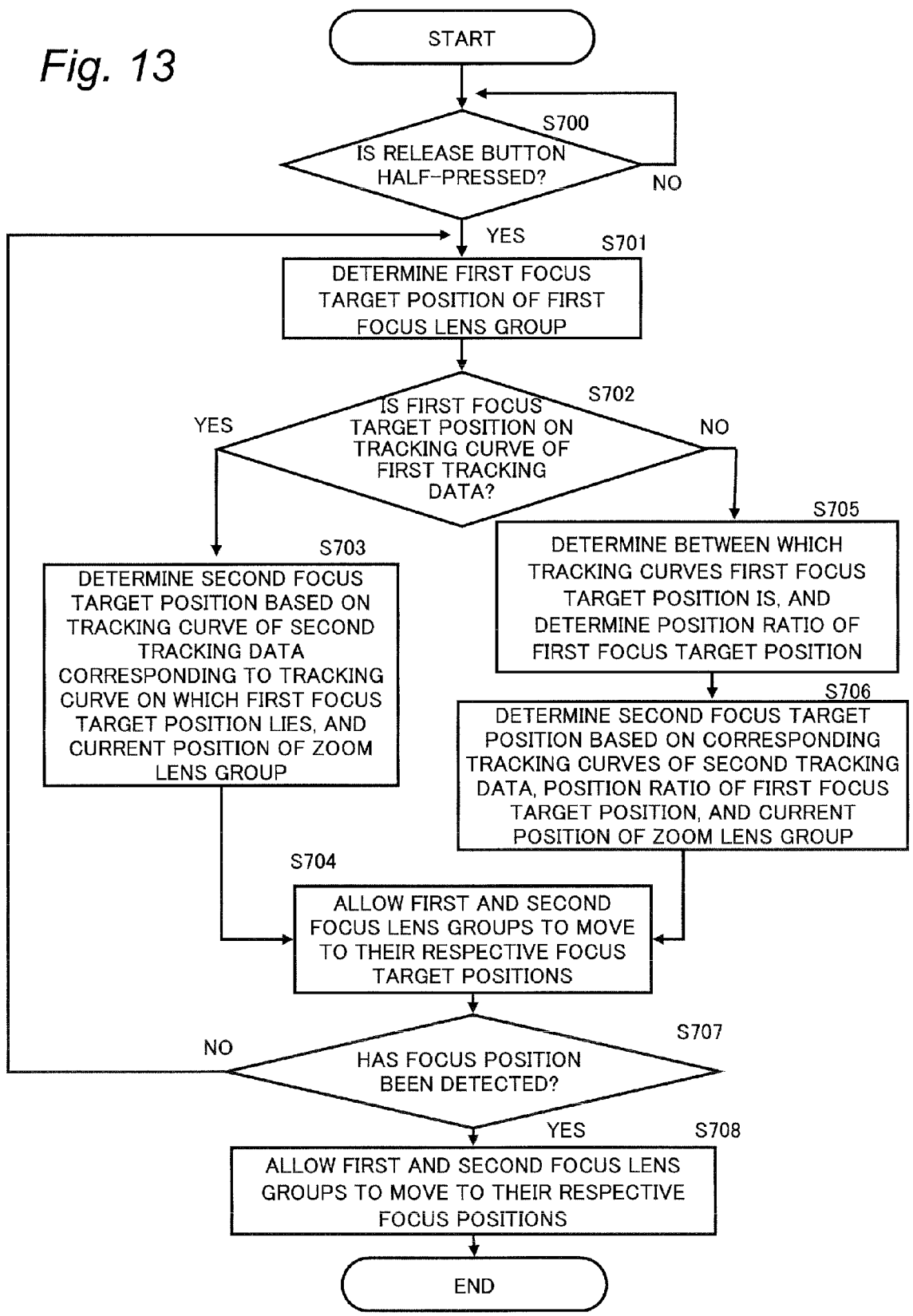
FIG. 13 is a flowchart for describing a method of determining the positions of the first and second focus lens groups during autofocus operation.

Referring to FIG. 13, the operation of the first focus lens group G4 and the second focus lens group G5 performed during AF operation by a contrast AF scheme will be described. After completing reset operation for each lens group which is described with reference to FIG. 6, the body microcomputer 110 monitors whether the release button 130 has been placed in a half-press state (S700). When the body microcomputer 110 determines that the release button 130 has been placed in a half-press state (Yes at step S700), the body microcomputer 110 starts AF operation.

When AF operation starts, the body microcomputer 110 detects a contrast value of image data generated through the lens groups, with the zoom lens group G2 and the focus lens groups G4 and G5 being at the current positions. In addition, the body microcomputer 110 grasps the position of the first focus lens group G4 by communication with the interchangeable lens 200. Then, the body microcomputer 110 outputs a control signal to the lens microcomputer 240 so as to allow the first focus lens group G4 and the second focus lens group G5 to perform search operation.

Here, the body microcomputer 110 recognizes the first focus lens group G4 and the second focus lens group G5 as a single unit "focus lens", instead of recognizing them as individual units. That is, the body microcomputer 110 outputs a control signal to the "focus lens" but not to a plurality of focus lens groups. By this, even if there are three or more focus lens groups, the body microcomputer 110 can output the same control signal as that for the case of a single focus lens group.

When the lens microcomputer 240 receives the control signal for allowing the "focus lens" to perform search operation from the body microcomputer 110, the lens microcomputer 240 outputs a control signal to the lens drive controller 241 to allow the first focus lens group G4 to perform search operation. Specifically, the body microcomputer 110 notifies the lens microcomputer 240 of a focus target position of the "focus lens" which is distant by a predetermined distance from the current position of the "focus lens". Based on the notified focus target position of the "focus lens", the lens microcomputer 240 determines a focus target position (first focus target position) of the first focus lens group G4 (S701). The position of the zoom lens group G2 is maintained at the current position.

Subsequently, the lens microcomputer 240 refers to first tracking data. The lens microcomputer 240 determines whether the determined first focus target position is on a tracking curve of the first tracking data (S702).

If the lens microcomputer 240 determines that the first focus target position is on a tracking curve (Yes at step S702), then the lens microcomputer 240 obtains a tracking curve of second tracking data corresponding to the tracking curve on which the first focus target position lies. The lens microcomputer 240 determines a second focus target position based on the obtained tracking curve and the current position of the zoom lens group G2 (S703). Here, a method of determining a second focus target position is the same as the method of determining a second focus target position during the above-described zoom tracking operation.

When the first and second focus target positions are determined, the lens microcomputer 240 allows the first focus lens group G4 and the second focus lens group G5 to move to their respective focus target positions (S704).

Subsequently, the lens microcomputer 240 determines whether an ideal focus position has been detected as a result of the movement of the first focus lens group G4 and the second focus lens group G5 to their respective focus target positions (S707). Here, to detect an ideal focus position, the lens microcomputer 240 compares the contrast value of the image data obtained after the movement of the focus lens groups G4 and G5 with the contrast value of the image data obtained before the movement.

If the contrast value obtained after the movement is higher than that obtained before the movement, then the lens microcomputer 240 determines that a focus position has not been detected (No at step S707). This is because it is considered that there is a focus position ahead. In this case, the lens microcomputer 240 determines a next first focus target position (S701), by which the search operation continues.

On the other hand, if the contrast value obtained after the movement of the focus lens groups G4 and G5 is lower than that obtained before the movement, then the lens microcomputer 240 determines that a focus position has been detected (Yes at step S707). This is because it is considered that the first focus lens group G4 and the second focus lens group G5 have already passed through their respective focus positions. In this case, the lens microcomputer 240 determines focus positions of the focus lens groups G4 and G5 based on a plurality of contrast values obtained so far. Then, the lens microcomputer 240 allows the first focus lens group G4 and the second focus lens group G5 to move to the determined focus positions (S708).

On the other hand, if the first focus target position is not present on any of the tracking curves of the first tracking data (No at step S702), then the lens microcomputer 240 calculates a position ratio of the first focus lens group G4 with respect to the first tracking data (S705). A method of calculating the position ratio is the same as the above-described method of calculating a position ratio of the current position of the first focus lens group G4 during the zoom tracking operation. When the lens microcomputer 240 calculates the position ratio of the first focus lens group G4, the lens microcomputer 240 determines a second focus target position based on the calculated position ratio, the second tracking data, and the current position of the zoom lens group G2 (S706). Here, a method of determining a second focus target position is the same as the above-described method used during the zoom tracking operation. When the second focus target position is determined, the lens microcomputer 240 allows the first focus lens group G4 and the second focus lens group G5 to move to their respective focus target positions (S704). After the movement of the focus lens groups G4 and G5, the lens microcomputer 240 determines whether an ideal focus position has been detected (S707). The operation performed after this determination is the same as that for the case in which the first focus target position is on a tracking curve (S707 to S708).

The above-described operation (S701 to S707) of the first focus lens group G4 and the second focus lens group G5 is repeated until an ideal focus position is detected.

<2-3-1. Specific Example of AF Operation>

Figure 14:
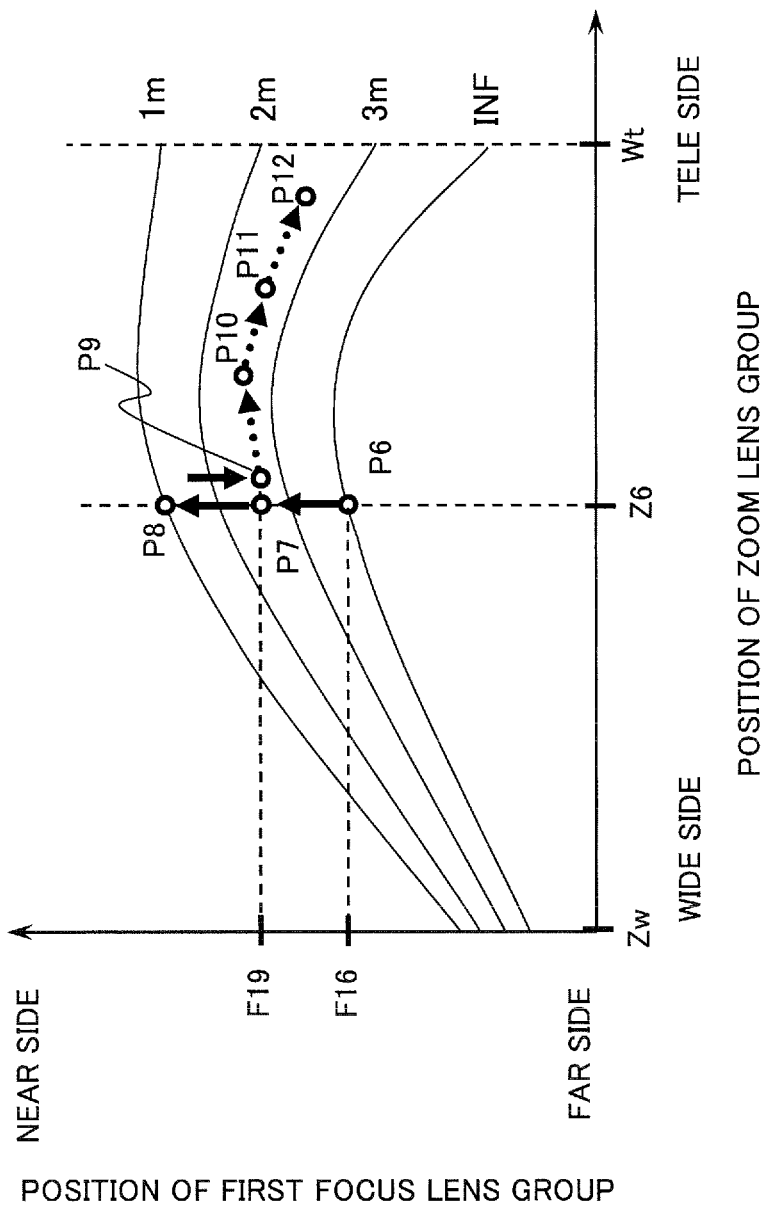
FIG. 14 is a diagram showing a change in the position of the first focus lens group during autofocus operation.
Figure 15:
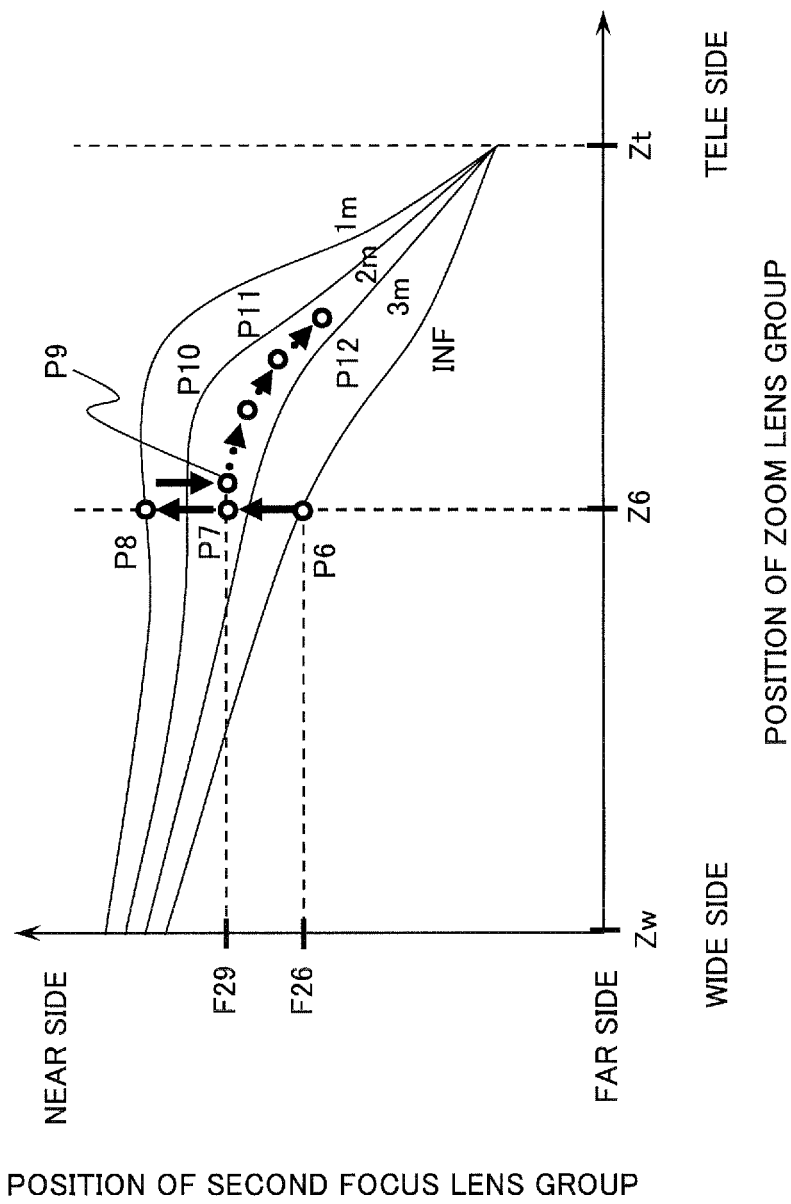
FIG. 15 is a diagram showing a change in the position of the second focus lens group during the autofocus operation.

Referring to FIGS. 14 and 15, the operation of the first focus lens group G4 and the second focus lens group G5 performed during AF operation will be described using a specific example. FIG. 14 shows first tracking data and FIG. 15 shows second tracking data. The horizontal axes in FIGS. 14 and 15 represent the position of the zoom lens group G2. The vertical axis in FIG. 14 represents the position of the first focus lens group G4 and the vertical axis in FIG. 15 represents the position of the second focus lens group G5.

In the example shown in FIGS. 14 and 15, it is assumed that the current position of the zoom lens group G2 is position Z6, the current position of the first focus lens group G4 is F16 in FIG. 14, and the current position of the second focus lens group G5 is F26 in FIG. 15.

When the lens microcomputer 240 receives a control signal for search operation for AF operation from the body microcomputer 110, the lens microcomputer 240 sends a first focus target position to the lens drive controller 241. In this example, position P7 in FIG. 14 is the first focus target position.

In this case, since the first focus target position P7 is present between a tracking curve (2 m) and a tracking curve (3 m), the lens microcomputer 240 determines that the first focus target position P7 is not on any of the tracking curves (No at step S702 in FIG. 13). Thus, the lens microcomputer 240 calculates a position ratio of the first focus target position P7. Then, the lens microcomputer 240 calculates a second focus target position based on the calculated position ratio of the first focus target position, the second tracking data, and the current position of the zoom lens group G2.

When the first and second focus target positions are calculated, the lens microcomputer 240 allows the first focus lens group G4 and the second focus lens group G5 to move to their respective focus target positions. When the focus lens groups G4 and G5 are allowed to move, the body microcomputer 110 detects a contrast value from image data generated in that state. In this example, it is assumed that the contrast value at this time is higher than that obtained when the focus lens groups G4 and G5 are present at position P6 in FIGS. 14 and 15, respectively.

The body microcomputer 110 compares the contrast value obtained after the movement of the focus lens groups G4 and G5 with the contrast value obtained before the movement. In this example, since the contrast value obtained after the movement is higher than that obtained before the movement, the focus position search operation continues.

Subsequently, the lens microcomputer 240 determines, for example, a position indicated by position P8 in FIG. 14, as a next first focus target position. In this example, it is assumed that position P8 is present on a tracking curve (1 m) of the first tracking data.

In this case, the lens microcomputer 240 determines a second focus target position based on a tracking curve (1 m) of the second tracking data corresponding to the tracking curve (1 m) of the first tracking data on which the first focus target position P8 lies, and the current position of the zoom lens group G2. Then, the lens microcomputer 240 allows the focus lens groups G4 and G5 to move to the determined first and second focus target positions.

After the focus lens groups G4 and G5 are allowed to move, the body microcomputer 110 detects a contrast value from image data generated in that state. Then, the body microcomputer 110 compares the contrast value at position P8 in FIGS. 14 and 15 with the contrast value at position P7. As a result, in this example, it is assumed that the contrast value at position P8 is determined to be lower than the contrast value at position P7.

Then, the body microcomputer 110 calculates a maximum value from among the contrast values detected at positions P6, P7, and P8 in FIGS. 14 and 15. In this example, it is assumed that the maximum contrast value is detected in a state indicated by position P7. Thus, the body microcomputer 110 allows the first focus lens group G4 to move to position P9 (P7) in FIG. 14 and the second focus lens group G5 to position P9 (P7) in FIG. 15. Here, position P9 is the same as position P7. The digital camera 1000 of the present embodiment performs AF operation in the above-described manner.

Note that when the above-described AF operation is performed, followed by zoom operation, the target positions of the lens groups G2, G4, and G5 are determined in the following flow: position P9→P10→P11→P12 in FIGS. 14 and 15, and then the lens groups G2, G4, and G5 are allowed to move in such a flow. A method of calculating a position ratio of the current position of the first focus lens group G4 and a method of determining a first focus target position and a second focus target position at this time are the same as those for the above-described zoom tracking operation.

In this example, it is assumed that the position ratio of the current position of the first focus lens group G4 at position P9 with respect to the tracking curve (2 m) and tracking curve (3 m) of the first tracking data is 60:40. Thus, the position ratio of the first and second focus target positions at position P10, P11, and P12 in FIGS. 14 and 15 is 60:40.

In the above-described manner, the digital camera 1000 drives the first focus lens group G4 and the second focus lens group G5 in a conjunctive manner such that the position ratio of the first focus lens group G4 coincides with the position ratio of the second focus lens group G5. At this time, a target position of the first focus lens group G4 and a target position of the second focus lens group G5 are determined according to first and second tracking data, respectively. Here, as described above, the range for the first focus lens group G4 to move delimited by the first tracking data may be larger or smaller than the range for the second focus lens group G5 to move delimited by the second tracking data. Hence, even though the first focus lens group G4 and the second focus lens group G5 move to the same zoom position, they have different moving distances. Namely, upon focusing, the movement speed ratio between the first focus lens group G4 and the second focus lens group G5 differs depending on the zoom position. By this, the digital camera 1000 can perform ideal tracking operation in accordance with zoom operation. In addition, each tracking curve included in tracking data differs depending on the subject distance. Hence, upon focusing, the movement speed ratio between the first focus lens group G4 and the second focus lens group G5 also differs depending on the subject distance. By this, the digital camera 1000 can perform ideal tracking operation in accordance with zoom operation, even at different subject distances.

<3. Summary of the Present Embodiment>

As described above, a lens controller of the digital camera 1000 of the present embodiment controls the drive of an optical system including the first focus lens group G4 and the second focus lens group G5 for adjusting the focus state of a subject image; and the zoom lens group G2 for adjusting the angle of view of the subject image. The lens controller includes the first focus motor 264 that drives the first focus lens group G4; the second focus motor 265 that drives the second focus lens group G5; the lens microcomputer 240 that controls the first and second focus motors 264 and 265; and the ROM 210 that stores first tracking data which is information that associates the position of the first focus lens group G4 with the position of the zoom lens group G2 for focusing on a subject and second tracking data which is information that associates the position of the second focus lens group G5 with the position of the zoom lens group G2 for focusing on the subject. When the lens microcomputer 240 drives the first and second focus lens groups G4 and G5, the lens microcomputer 240 determines a first target position which is a movement target position of the first focus lens group G4; determines a positional relationship of the first target position with respect to the first tracking data, based on the first tracking data and the position of the zoom lens group G2; determines a second target position which is a movement target position of the second focus lens group G5, based on the positional relationship of the first target position, the second tracking data, and the position of the zoom lens group G2; and controls the first focus motor 264 to allow the first focus lens group G4 to move to the first target position, and controls the second focus motor 265 to allow the second focus lens group G5 to move to the second target position.

By such a configuration, when the zoom lens group G2 is driven in a focus state, the lens controller of the present embodiment drives the first and second focus lens groups G4 and G5, based on the first and second tracking data. By this, zoom tracking can be performed and excellent optical properties can be obtained at subject distances in a wider range than that for the case of a single focus lens group.

<4. Other Aspects>

The aspect is not limited to the above-described embodiment. Various modifications and changes may be made thereto without departing from the spirit and scope of the aspect. The above-described embodiment is exemplified as a preferred one. The above-described embodiment is not intended to limit the aspect or apparatuses to which the aspect is applied or the applicability of the aspect.

In the above-described embodiment, after determining a first and a second focus target position, the focus lens groups G4 and G5 are allowed to move to the first and second focus target positions, respectively. However, the aspect is not limited thereto. After determining a first focus target position and allowing the first focus lens group G4 to move to the first focus target position, a second focus target position may be determined and the second focus lens group G5 may be allowed to move to the second focus target position.

In the above-described embodiment, each lens (a fixed lens, a zoom lens, and a focus lens) is composed of a lens group. However, the aspect is not limited thereto. Each lens may be composed of a single lens.

In the above-described embodiment, the lens microcomputer 240 controls zoom tracking operation. However, the aspect is not limited thereto. The body microcomputer 110 may control zoom tracking operation.

In the above-described embodiment, zoom operation may be motor zoom or manual zoom. Note, however, that in the case of manual zoom, an initial position of each focus lens group is determined to be a position on a tracking curve (INF) associated with a zoom position for when the power supply is placed in an ON state.

In the above-described embodiment, the lens motors 263, 264, and 265 are not limited to stepping motors and can be any type of motors as long as they can drive a plurality of focus lens groups independently of each other and can grasp positions to which the focus lens groups are driven.

In reset operation of the above-described embodiment, in order to grasp the absolute positions of the focus lens groups G4 and G5, a photo interrupter is provided to each of the focus lens groups G4 and G5. However, the aspect is not limited thereto. A photo interrupter may be shared between the focus lens groups G4 and G5 and thus a single photo interrupter may be provided.

In the above-described embodiment, zoom operation by the user may be accepted by an operating member on the interchangeable lens 200, or may be accepted by an operating member on the camera body 100. When zoom operation is accepted by the operating member on the camera body 100, information about the operation is sent to the interchangeable lens 200 from the camera body 100.

The digital camera 1000 of the above-described embodiment includes two focus lens groups. However, the aspect is not limited thereto. The digital camera 1000 may include three or more focus lens groups. In that case, a certain focus lens group is used as a main focus lens group (the first focus lens group G4 in the above-described embodiment) and other focus lens groups are driven based on their respective tracking data and a drive position of the main focus lens group.

The digital camera 1000 of the above-described embodiment includes the camera body 100 and the interchangeable lens 200 detachable from the camera body 100. However, the aspect is not limited thereto. The aspect can also be applied to cameras with built-in lenses. The aspect can applied to imaging apparatuses including a plurality of focus lens groups.

Industrial Applicability

The embodiments are useful for electronic equipment having a lens control apparatus, such as an imaging apparatus including a plurality of focus lens groups (a camcorder, a mobile phone with a camera, etc.).

What is claimed is:

1. A lens control apparatus for controlling an optical system including a first and a second focus lens, and a zoom lens, the lens control apparatus comprising:
   a first driver operable to drive the first focus lens;
   a second driver operable to drive the second focus lens;
   a controller operable to control the first and second drivers; and
   a storage unit operable to store first tracking data and second tracking data, the first tracking data being information that associates a position of the first focus lens with a position of the zoom lens, and the second tracking data being information that associates a position of the second focus lens with the position of the zoom lens, wherein
   when the controller drives the first and second focus lenses, the controller:
      determines a first target position, the first target position being a movement target position of the first focus lens;
      determines a positional relationship of the first target position with respect to the first tracking data, based on the first tracking data and the position of the zoom lens;
      determines a second target position based on the positional relationship of the first target position, the second tracking data, and the position of the zoom lens, the second target position being a movement target position of the second focus lens; and controls the first driver to allow the first focus lens to move to the first target position, and controls the second driver to allow the second focus lens to move to the second target position.

2. The lens control apparatus according to claim 1, wherein the controller determines the second target position based on the positional relationship of the first target position, the second tracking data, and the position of the zoom lens such that a positional relationship of the second target position with respect to the second tracking data is the same as the positional relationship of the first target position.

3. The lens control apparatus according to claim 2, wherein:
the first tracking data includes a plurality of first tracking curves provided for different subject distances; and
the second tracking data includes a plurality of second tracking curves provided for same subject distances as the subject distances for the first tracking curves.

4. The lens control apparatus according to claim 3, further comprising an accepting unit operable to accept an autofocus operation instruction, wherein:
when the accepting unit accepts an autofocus operation instruction, the controller determines the first target position;
when the first target position is present on any of the first tracking curves, the controller selects one of the second tracking curves corresponding to the first tracking curve on which the first target position is present, and determines the second target position based on the selected second tracking curve and the position of the zoom lens;
when the first target position is not present on any of the first tracking curves, the controller selects two of the first tracking curves present to sandwich the first target position, calculates a position ratio, selects two of the second tracking curves corresponding to the two selected first tracking curves, and determines the second target position such that a ratio in which an interval between the two selected second tracking curves is internally divided by the second target position is the same as the position ratio, the position ratio being a ratio in which an interval between the two selected first tracking curves is internally divided by the first target position; and
the controller controls the first driver to allow the first focus lens to move to the first target position, and controls the second driver to allow the second focus lens to move to the second target position.

5. The lens control apparatus according to claim 3, further comprising a zoom instruction accepting unit that accepts a zoom operation instruction, wherein
in a focus state with the zoom lens, the first focus lens, and the second focus lens being present at their respective current positions,
when the zoom instruction accepting unit accepts a zoom operation instruction, the controller determines a zoom target position indicating a movement target position of the zoom lens, according to the instruction,
when the current position of the first focus lens is present on any of the first tracking curves, the controller:
determines the first target position based on the first tracking curve and the zoom target position;
selects one of the second tracking curves corresponding to the first tracking curve; and
determines the second target position based on the selected second tracking curve and the zoom target position, and
when the current position of the first focus lens is not present on any of the first tracking curves, the controller:
selects two of the first tracking curves present to sandwich the current position of the first focus lens;
calculates a position ratio, the position ratio being a ratio in which an interval between the two selected first tracking curves is internally divided by the current position of the first focus lens;
determines the first target position such that a ratio in which the interval between the two selected first tracking curves is internally divided by the first target position is the same as the position ratio when the zoom lens is at the zoom target position;
selects two of the second tracking curves corresponding to the two selected first tracking curves;
determines the second target position such that a ratio in which an interval between the two selected second tracking curves is internally divided by the second target position is the same as the position ratio when the zoom lens is at the zoom target position; and
controls the first driver to allow the first focus lens to move to the first target position, and controls the second driver to allow the second focus lens to move to the second target position.

6. An interchangeable lens comprising:
an optical system including a first and a second focus lens, and a zoom lens;
a lens controller operable to control driving of the optical system, wherein the lens controller includes:
a first driver operable to drive the first focus lens;
a second driver operable to drive the second focus lens;
a controller operable to control the first and second drivers; and
a storage unit operable to store first tracking data and second tracking data, the first tracking data being information that associates a position of the first focus lens with a position of the zoom lens, and the second tracking data being information that associates a position of the second focus lens with the position of the zoom lens, and
when the controller drives the first and second focus lenses, the controller:
determines a first target position, the first target position being a movement target position of the first focus lens;
determines a positional relationship of the first target position with respect to the first tracking data, based on the first tracking data and the position of the zoom lens;
determines a second target position based on the positional relationship of the first target position, the second tracking data, and the position of the zoom lens, the second target position being a movement target position of the second focus lens; and
controls the first driver to allow the first focus lens to move to the first target position, and controls the second driver to allow the second focus lens to move to the second target position.

7. The interchangeable lens according to claim 6, wherein the controller determines the second target position based on the positional relationship of the first target position, the second tracking data, and the position of the zoom lens such that a positional relationship of the second target position with respect to the second tracking data is the same as the positional relationship of the first target position.

8. The interchangeable lens according to claim 7, wherein:
the first tracking data includes a plurality of first tracking curves provided for different subject distances; and the second tracking data includes a plurality of second tracking curves provided for same subject distances as the subject distances for the first tracking curves.

9. The interchangeable lens according to claim 8, wherein:
the lens controller further includes an accepting unit operable to accept an autofocus operation instruction;
when the accepting unit accepts an autofocus operation instruction, the controller determines the first target position;
when the first target position is present on any of the first tracking curves, the controller selects one of the second tracking curves corresponding to the first tracking curve on which the first target position is present, and determines the second target position based on the selected second tracking curve and the position of the zoom lens;
when the first target position is not present on any of the first tracking curves, the controller selects two of the first tracking curves present to sandwich the first target position, calculates a position ratio, selects two of the second tracking curves corresponding to the two selected first tracking curves, and determines the second target position such that a ratio in which an interval between the two selected second tracking curves is internally divided by the second target position is the same as the position ratio, the position ratio being a ratio in which an interval between the two selected first tracking curves is internally divided by the first target position; and
the controller controls the first driver to allow the first focus lens to move to the first target position, and controls the second driver to allow the second focus lens to move to the second target position.

10. The interchangeable lens according to claim 8, wherein the lens controller further includes a zoom instruction accepting unit that accepts a zoom operation instruction,
in a focus state with the zoom lens, the first focus lens, and the second focus lens being present at their respective current positions,
when the zoom instruction accepting unit accepts a zoom operation instruction, the controller determines a zoom target position indicating a movement target position of the zoom lens, according to the instruction,
when the current position of the first focus lens is present on any of the first tracking curves, the controller:
determines the first target position based on the first tracking curve and the zoom target position;
selects one of the second tracking curves corresponding to the first tracking curve; and
determines the second target position based on the selected second tracking curve and the zoom target position, and
when the current position of the first focus lens is not present on any of the first tracking curves, the controller:
selects two of the first tracking curves present to sandwich the current position of the first focus lens;
calculates a position ratio, the position ratio being a ratio in which an interval between the two selected first tracking curves is internally divided by the current position of the first focus lens;
determines the first target position such that a ratio in which the interval between the two selected first tracking curves is internally divided by the first target position is the same as the position ratio when the zoom lens is at the zoom target position;
selects two of the second tracking curves corresponding to the two selected first tracking curves;
determines the second target position such that a ratio in which an interval between the two selected second tracking curves is internally divided by the second target position is the same as the position ratio when the zoom lens is at the zoom target position; and
controls the first driver to allow the first focus lens to move to the first target position, and controls the second driver to allow the second focus lens to move to the second target position.

11. The lens control apparatus according to claim 1, wherein:
the first tracking data includes information indicating a plurality of positions of the first focus lens which correspond to a plurality of positions of the zoom lens, respectively, for maintaining a focused state; and
the second tracking data includes information indicating a plurality of positions of the second focus lens which correspond to a plurality of positions of the zoom lens, respectively, for maintaining a focused state.

12. The interchangeable lens according to claim 6, wherein:
the first tracking data includes information indicating a plurality of positions of the first focus lens which correspond to a plurality of positions of the zoom lens, respectively, for maintaining a focused state; and
the second tracking data includes information indicating a plurality of positions of the second focus lens which correspond to a plurality of positions of the zoom lens, respectively, for maintaining a focused state.

* * * * *